United States Patent
Kapralou et al.

(10) Patent No.: US 12,220,681 B2
(45) Date of Patent: Feb. 11, 2025

(54) MINERAL COMPOSITION

(71) Applicant: IMERTECH SAS, Paris (FR)

(72) Inventors: Christina Kapralou, Nea Makri (GR); Thanasis Karalis, Chalandri Attiki (GR); Christos Dedeloudis, Paleo Faliro (GR)

(73) Assignee: ImerTech SAS, Paris (FR)

( * ) Notice: Subject to any disclaimer, the term of this patent is extended or adjusted under 35 U.S.C. 154(b) by 816 days.

(21) Appl. No.: 17/298,126

(22) PCT Filed: Nov. 28, 2019

(86) PCT No.: PCT/EP2019/082912
§ 371 (c)(1),
(2) Date: May 28, 2021

(87) PCT Pub. No.: WO2020/109468
PCT Pub. Date: Jun. 4, 2020

(65) Prior Publication Data
US 2022/0048008 A1      Feb. 17, 2022

(30) Foreign Application Priority Data

Nov. 29, 2018 (EP) .................................. 18386034

(51) Int. Cl.
*B01J 20/12* (2006.01)
*A23L 5/49* (2016.01)
(Continued)

(52) U.S. Cl.
CPC ................ *B01J 20/12* (2013.01); *A23L 5/49* (2016.08); *B01J 20/10* (2013.01); *B01J 20/103* (2013.01); *B01J 20/28061* (2013.01); *B01J 20/28073* (2013.01); *C11B 3/10* (2013.01); *A23V 2002/00* (2013.01); *B01J 20/28004* (2013.01); *B01J 20/28011* (2013.01); *B01J 20/28057* (2013.01); *B01J 20/28071* (2013.01); *B01J 2220/42* (2013.01); *C01B 33/38* (2013.01)

(58) Field of Classification Search
CPC ................ B01J 20/103; B01J 20/28004; B01J 20/28057; B01J 20/28061; B01J 2220/42
See application file for complete search history.

(56) References Cited

U.S. PATENT DOCUMENTS

| 5,840,320 A | 11/1998 | Odom |
| 6,093,669 A | 7/2000 | Banin et al. |

(Continued)

FOREIGN PATENT DOCUMENTS

| CA | 2161070 A1 * | 6/1996 | ............... C09K 3/10 |
| CN | 102753137 A | 10/2012 | |

(Continued)

OTHER PUBLICATIONS

International Search Report and Written Opinion mailed Mar. 19, 2020, in International Application No. PCT/EP2019/082912.

(Continued)

*Primary Examiner* — Jun Li
(74) *Attorney, Agent, or Firm* — Finnegan, Henderson Farabow, Garrett & Dunner, LLP

(57) ABSTRACT

Compositions suitable for the purification of liquids, methods for making said compositions, and the uses of said compositions.

15 Claims, 5 Drawing Sheets

(51) Int. Cl.
    *B01J 20/10*     (2006.01)
    *B01J 20/28*     (2006.01)
    *C11B 3/10*     (2006.01)
    *C01B 33/38*     (2006.01)

(56) References Cited

U.S. PATENT DOCUMENTS

| | | | |
|---|---|---|---|
| 2004/0146444 A1* | 7/2004 | Dokter | A01K 1/0152 423/335 |
| 2005/0033256 A1* | 2/2005 | Schmidt | C08J 7/056 604/370 |
| 2009/0308323 A1* | 12/2009 | Van Nieuwenhuijzen-Van Rooijen | A01K 1/0155 119/173 |
| 2010/0031853 A1 | 2/2010 | Visocekas et al. | |
| 2012/0046165 A1 | 2/2012 | Lu et al. | |
| 2016/0289618 A1 | 10/2016 | Hu et al. | |
| 2017/0259243 A1 | 9/2017 | Lyngsie et al. | |
| 2018/0326395 A1 | 11/2018 | Fleming et al. | |

FOREIGN PATENT DOCUMENTS

| | | | |
|---|---|---|---|
| CN | 102906201 A | 1/2013 | |
| CN | 108654574 A | 10/2018 | |
| DE | 19541735 A1 * | 5/1997 | ............ A23L 33/16 |
| WO | WO-2008-008940 A2 | 1/2008 | |
| WO | WO 2012/023952 A1 | 2/2012 | |
| WO | WO 2015/100050 A1 | 7/2015 | |
| WO | WO 2016/137860 A1 | 9/2016 | |
| WO | WO 2017/019845 A1 | 2/2017 | |
| WO | WO-2017-087836 A1 | 5/2017 | |

OTHER PUBLICATIONS

Barrett et al., "The Determination of Pore Volume and Area Distributions in Porous Substances. I. Computations from Nitrogen Isotherms," The Volume and Area Distributions in Porous Substances, 73:373-380 (1951).

Bear, "The Equation of Motion of a Homogenous Fluid: Derivations of Darcy's Law," Dynamics of Fluids in Porous Media, 2nd edition, 161-177 (1988).

Brunauer et al., "Adsorption of Gases in Multimolecular Layers," Journal of the American Chemical Society, 60:309-319 (1938).

* cited by examiner

MINERAL COMPOSITION

CLAIM FOR PRIORITY

This application is a U.S. national phase entry under 35 U.S.C. § 371 from PCT International Application No. PCT/EP2019/082912, filed Nov. 28, 2019, which claims the benefit of priority of European Patent Application No. 18386034.5, filed Nov. 29, 2018, from both of which this application claims priority and both of which are incorporated herein by reference.

TECHNICAL FIELD

The present invention relates generally to compositions suitable for use in bleaching and/or filtering liquids, methods for making these compositions and the various uses of these compositions, particularly for use in bleaching and/or filtering liquids, including oils such as edible oils.

BACKGROUND

An important step during the production of edible oils is the bleaching stage, wherein coloured pigments (e.g. chlorophylls and carotenes) are removed, along with other contaminants which may affect the overall appearance and taste of the oil.

High Performance Bleaching Earths (HPBEs), which are high quality bentonites activated with mineral acids at high temperatures in sealed reactors, are usually used for this bleaching stage. However, the process of making HPBEs typically generates large amounts of acidic residues and large amounts of liquid waste.

Further, while HPBE may remove colorants, they also simultaneously adsorb soaps, waxes, phospholipids, free fatty acids, and heavy metals. This reduces their available active surface, which severely affects their bleaching capacity. To address this problem, producers currently tend to misuse HPBEs by adding them in higher dosages. This affects oil production costs both directly (since more material is purchased) and indirectly (increased oil losses in spent filter cake—approximately 60% of the BE weight).

Another issue is that spent HPBE is very fine and has poor filtration characteristics. When HPBE is added in high dosages, more time and energy is required for filtration.

It is therefore desirable to provide alternative and/or improved compositions suitable for use in bleaching edible oils.

SUMMARY

In accordance with a first aspect of the present invention there is provided a composition comprising a smectite, palygorskite, or sepiolite mineral, a second mineral, and synthetic amorphous silica, wherein the synthetic amorphous silica is dispersed on the surface of at least one of the smectite, palygorskite, or sepiolite mineral, and the second mineral.

In accordance with a second aspect of the present invention there is provided a method for making a composition, the method comprising forming silica on at least one of a smectite, palygorskite, or sepiolite mineral, and a second mineral, such that synthetic amorphous silica is dispersed on the surface of the smectite, palygorskite, or sepiolite mineral and/or the second mineral. The composition may, for example, be in accordance with the first aspect of the present invention, including any embodiment thereof.

In certain embodiments, the synthetic amorphous silica is dispersed on the surface of both of the smectite, palygorskite, or sepiolite mineral and the second mineral.

In certain embodiments, the synthetic amorphous silica is dispersed on the surface of the smectite, palygorskite, or sepiolite mineral, and the smectite, palygorskite, or sepiolite mineral having synthetic amorphous silica dispersed on its surface is combined with a second mineral. The second mineral may, for example, have synthetic amorphous silica dispersed on its surface.

In certain embodiments, the synthetic amorphous silica is dispersed on the surface of the second mineral, and the second mineral having synthetic amorphous silica dispersed on its surface is combined with a smectite, palygorskite, or sepiolite mineral. The smectite, palygorskite, or sepiolite mineral may, for example, have synthetic amorphous silica dispersed on its surface.

In accordance with a third aspect of the present invention there is provided a composition obtained by and/or obtainable by the method of the second aspect of the present invention, including any embodiment thereof.

In accordance with a fourth aspect of the present invention there is provided a use of a composition comprising a smectite, palygorskite, or sepiolite mineral, a second mineral, and synthetic amorphous silica, for purification of a liquid. The composition may, for example, be in accordance with the first aspect of the present invention, including any embodiment thereof. The liquid may, for example, be an oil, for example edible oil, industrial oil, or biodiesel.

In accordance with a fifth aspect of the present invention there is provided a method of bleaching and/or filtering a liquid, the method comprising combining the liquid with a composition comprising a smectite, palygorskite, or sepiolite mineral, a second mineral, and synthetic amorphous silica. The composition may, for example, be in accordance with the first aspect of the present invention, including any embodiment thereof. The liquid may, for example, be an oil, for example edible oil, industrial oil, or biodiesel.

In certain embodiments of any aspect of the present invention the smectite, palygorskite, or sepiolite mineral is a smectite mineral. In certain embodiments of any aspect of the present invention the smectite mineral is bentonite.

In certain embodiments of any aspect of the present invention the second mineral is diatomite.

In certain embodiments of any aspect of the present invention the smectite mineral and/or the second mineral is moler.

In certain embodiments of any aspect of the present invention the synthetic amorphous silica is silica gel.

Certain embodiments of any aspect of the present invention may provide one or more of the following advantages:
- removal (e.g. improved removal) of colorants from a liquid (bleaching);
- filtration (e.g. improved filtration) of a liquid;
- reduced liquid loss (e.g. reduced oil loss) after bleaching and/or filtration;
- reduced amount of materials required;
- simultaneous neutralization of an acid treated smectite, palygorskite, or sepiolite mineral during formation of the composition;
- reduction in the volume of water used in the method of making the composition;
- improved yield, for example since the means of neutralization are incorporated into the end-product and are not removed afterwards.

The details, examples and preferences provided in relation to any particulate one or more of the stated aspects of the present invention will be further described herein and apply equally to all aspects of the present invention. Any combination of the embodiments, examples and preferences described herein in all possible variations thereof is encompassed by the present invention unless otherwise indicated herein, or otherwise clearly contradicted by context.

BRIEF DESCRIPTION OF THE FIGURES

The present invention may be described with reference to the following non-limiting Figures in which.

DETAILED DESCRIPTION

Figure 1:
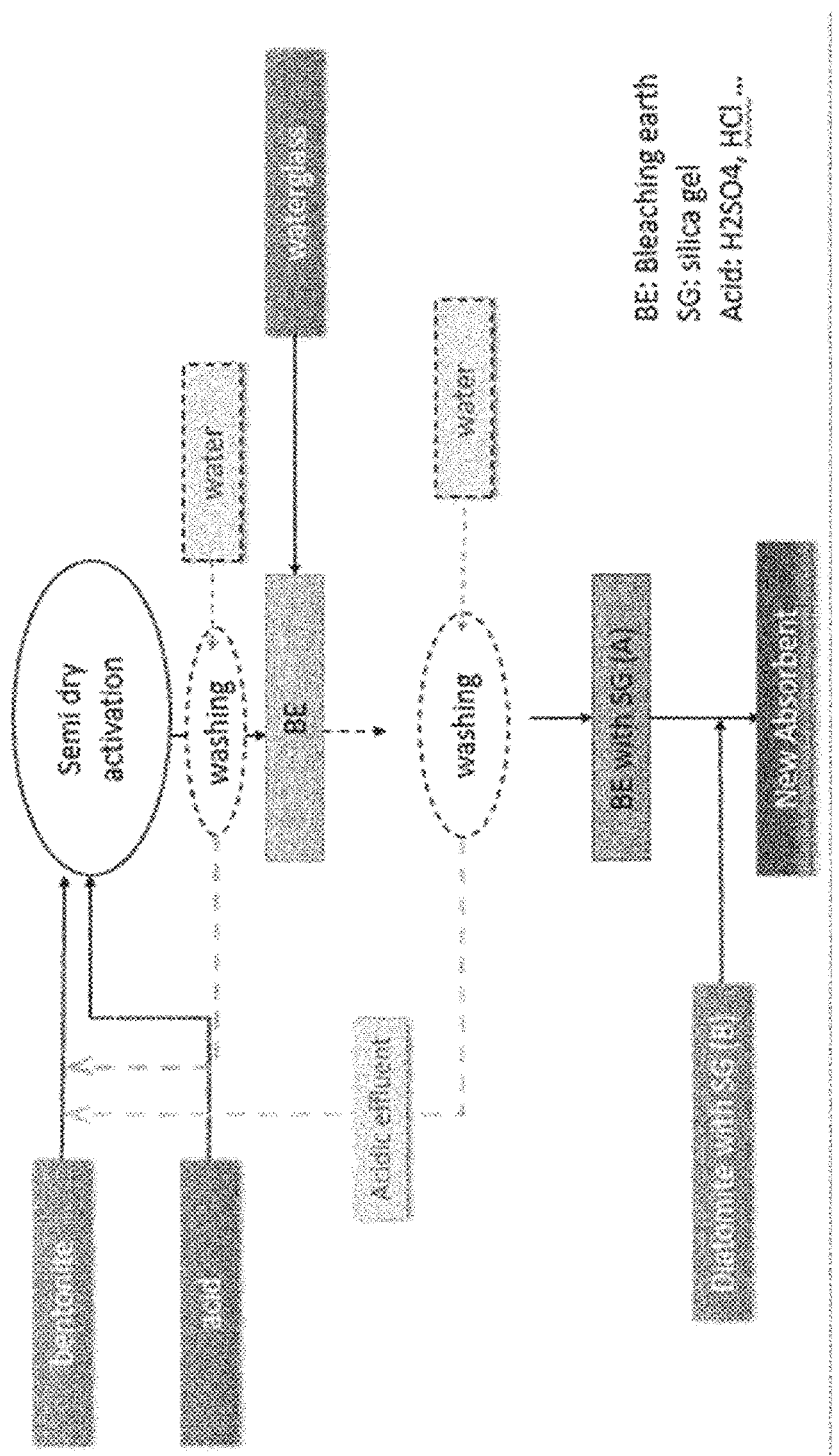
FIG. 1 is a schematic diagram of the method described in Example 1.

There is provided herein compositions suitable for bleaching and/or filtering liquids, for example liquid oils. The composition comprises a smectite, palygorskite, or sepiolite mineral, a second mineral, and synthetic amorphous silica, wherein the synthetic amorphous silica is dispersed on the surface of at least one of the smectite, palygorskite, or sepiolite mineral, and the second mineral. In certain embodiments, the synthetic amorphous silica is dispersed on the surface of both the smectite, palygorskite, or sepiolite mineral and the second mineral.

The composition may, for example, comprise one, two, or all of a smectite, palygorskite, or sepiolite mineral. The composition may, for example, consist essentially of a smectite, palygorskite, or sepiolite mineral, a second mineral, and synthetic amorphous silica. The composition may, for example, consist of a smectite, palygorskite, or sepiolite mineral, a second mineral, and synthetic amorphous silica.

The term "smectite mineral" used herein refers to a material that comprises a smectite mineral structure, namely a 2:1 structure of an octahedral sheet sandwiched between two tetrahedral sheets. Smectite minerals have a variable net negative charge, which may be balanced by one or more cations such as sodium, potassium, calcium, iron, aluminium or magnesium cations, or by hydrogen adsorbed externally on interlamellar surfaces. The smectite mineral may comprise a combination of types of cation, for example a mixture of monovalent, bivalent and trivalent cations. The smectite mineral may, for example, comprise (e.g. comprise only) a mixture of monovalent and bivalent cations.

For example, the smectite mineral may be selected from montmorillonite, beidellite, nontronite, saponite, hectorite or a combination of one or more thereof. In certain embodiments, the smectite mineral comprises, consists essentially of or consists of montmorillonite. Bentonite is a rock comprising mostly smectite. Therefore, in certain embodiments, the smectite mineral comes from bentonite.

The smectite mineral used in the compositions described herein may comprise monovalent cations. In certain embodiments, the smectite mineral comprises (e.g. comprises only) a mixture of monovalent, bivalent and trivalent cations. In certain embodiments, the smectite mineral comprises (e.g. comprises only) a mixture of monovalent and bivalent cations. In certain embodiments, the smectite mineral comprises only monovalent cations (in other words does not comprise any cations that are not monovalent). In certain embodiments, the monovalent cations are selected from sodium cations, potassium cations or a combination thereof. In certain embodiments, the bivalent cations are selected from calcium cations, magnesium cations or a combination thereof. In certain embodiments, the trivalent cations are aluminium cations. In certain embodiments, the smectite mineral (e.g. bentonite) comprises a mixture of calcium cations and sodium cations. In certain embodiments, the smectite mineral (e.g. bentonite) comprises a mixture of only calcium cations and sodium cations. In certain embodiments, the smectite mineral (e.g. bentonite) comprise calcium, magnesium, sodium, and potassium cations. In general, reference to cations in the smectite mineral refers to exchangeable cations in the smectite mineral. The term "calcium bentonite" used herein refers to a material where more than 50%, for example more than 70%, of the exchangeable cations are calcium.

The smectite mineral may be naturally occurring smectite mineral or treated smectite mineral. For example, cations such as calcium, potassium or magnesium in naturally occurring smectite mineral may have been replaced with sodium cations, for example by soda ash activation. This may be referred to as sodium-activated smectite clay. Soda ash activation may, for example, comprise addition of soda ash powder (sodium carbonate) to smectite mineral having a moisture content of at least about 20 wt %, for example at least about 22 wt % or at least about 35 wt %, and mixing, for example, by extrusion or kneading. The soda ash activated smectite clay may then be dried and processed (e.g. milled) to a powder having a desired particle size distribution.

The smectite mineral may comprise at least about 60 wt % smectite mineral structure. For example, the smectite mineral may comprise at about 65 wt % or at least about 70 wt % or at least about 75 wt % or at least about 80 wt % or at least about 85 wt % or at least about 90 wt % or at least about 95 wt % or at least about 96 wt % or at least about 97 wt % or at least about 98 wt % or at least about 99 wt % smectite mineral structure. For example, the smectite mineral may comprise up to about 100 wt % smectite mineral structure. For example, the smectite mineral may comprise up to about 99 wt % or up to about 98 wt % or up to about 97 wt % or up to about 95 wt % or up to about 90 wt % smectite mineral structure.

The smectite, palygorskite, or sepiolite mineral starting material may, for example, comprise equal to or less than about 40 wt % moisture. For example, the smectite, palygorskite, or sepiolite mineral starting material may comprise equal to or less than about 35 wt % or equal to or less than about 30 wt % or equal to or less than about 25 wt % or equal to or less than about 20 wt % or equal to or less than about 15 wt % moisture. Moisture content may, for example, be measured by heating the smectite, palygorskite, or sepiolite mineral until there is no further change in weight and comparing the weight before and after heating. The smectite, palygorskite, or sepiolite mineral starting material may, for example, comprise equal to or greater than about 0 wt % moisture. For example, the smectite, palygorskite, or sepiolite mineral may comprise equal to or greater than about 4 wt % or equal to or greater than about 5 wt % or equal to or greater than about 10 wt % or equal to or greater than about 15 wt % moisture. This may, for example, be determined by ASTM D2216-10 Standard Test Methods for Laboratory Determination of Water (Moisture) Content of Soil and Rock by Mass.

The term "palygorskite mineral" used herein refers to a material that comprises a palygorskite mineral structure. Palygorskite is a magnesium aluminium phyllosilicate with formula $(Mg,Al)_2Si_4O_{10}(OH)\cdot 4(H_2O)$. It may also be referred to as attapulgite.

The term "sepiolite mineral" used herein refers to a material that comprises a sepiolite mineral structure. Sepiolite is a complex magnesium silicate, typically having the chemical formula $Mg_4Si_6O_{15}(OH)_2\cdot 6H_2O$. It may also be referred to as meerschaum.

The smectite, palygorskite, or sepiolite mineral may, for example, be "acid-treated" or "acid activated". By "acid-treated" or "acid activated" it is meant that the smectite, palygorskite, or sepiolite mineral has been reacted with a highly concentrated (5 N to 30 N) mineral acid.

The smectite, palygorskite, or sepiolite mineral may preferably be a smectite mineral. The smectite mineral may, for example, be bentonite.

The second mineral may, for example, be any mineral that is different from the smectite, palygorskite, or sepiolite mineral already present in the composition.

The second mineral may, for example, be selected from one or more of the following: smectite mineral (e.g. bentonite, palygorskite mineral, sepiolite mineral, alkaline earth metal carbonate (for example dolomite, i.e. $CaMg(CO_3)_2$), metal sulphate (for example gypsum), metal silicate, metal oxide (for example iron oxide, chromia, antimony trioxide or silica), metal hydroxide, wollastonite, bauxite, talc (for example, French chalk), mica, zinc oxide (for example, zinc white or Chinese white), titanium dioxide (for example, anatase or rutile), zinc sulphide, calcium carbonate (for example precipitated calcium carbonate (PCC), ground calcium carbonate (GCC) or surface-modified calcium carbonate), barium sulphate (for example, barite, blanc fixe or process white), alumina hydrate (for example, alumina trihydrate, light alumina hydrate, lake white or transparent white), clay (for example kaolin, calcined kaolin, China clay or bentonite), diatomaceous earth (also referred to as diatomite or DE), moler, perlite, and combinations thereof.

In certain embodiments, the second mineral is selected from the group consisting of diatomite, perlite, moler, kaolin, talc, bentonite, or any combination of one or more thereof. In certain embodiments, the second mineral is selected from the group consisting of diatomite, perlite, moler, kaolin, talc, or any combination of one or more thereof. In certain embodiments, the second mineral is a filtration mineral (e.g. a mineral that is able to separate the liquid compositions that are bleached using the smectite, palygorskite, or sepiolite mineral described herein from the smectite, palygorskite, or sepiolite mineral). In certain embodiments, the second mineral is selected from diatomite, perlite, moler or a combination thereof. In certain embodiments, the second mineral is diatomite.

The terms diatomite and diatomaceous earth are used interchangeably. The diatomite is typically obtained from a natural diatomaceous earth, which may be obtained from a saltwater source or from a freshwater source. The diatomite may be diatomite in its crude form or after subjecting the material to one or more processing steps.

Diatomite is, in general, a sedimentary biogenic silica deposit comprising the fossilized skeletons of diatoms, one-celled algae-like plants that accumulate in marine or fresh water environments. Honeycomb silica structures generally give diatomite useful characteristics such as absorptive capacity and surface area, chemical stability, and low-bulk density. The diatomite may comprise about 90% $SiO_2$ mixed with other substances. Crude diatomite may comprise about 90% $SiO_2$, plus various metal oxides, such as but not limited to Al, Fe, Ca, and Mg oxides. The diatomite may have any of the various appropriate forms now known to the skilled artisan or hereafter discovered.

The diatomaceous earth may be a commercially available diatomite product. For example, the diatomite may be a material available under the Celite® trade name available from Imerys Filtration Minerals.

The second mineral starting material may, for example, comprise equal to or less than about 40 wt % moisture. For example, the second mineral starting material may comprise equal to or less than about 35 wt % or equal to or less than about 30 wt % or equal to or less than about 25 wt % or equal to or less than about 20 wt % or equal to or less than about 15 wt % moisture. Moisture content may, for example, be measured by heating the second mineral until there is no further change in weight and comparing the weight before and after heating. The second mineral starting material may, for example, comprise equal to or greater than about 0 wt % moisture. For example, the second mineral may comprise equal to or greater than about 4 wt % or equal to or greater than about 5 wt % or equal to or greater than about 10 wt % or equal to or greater than about 15 wt % moisture. This may, for example, be determined by ASTM D2216-10 Standard Test Methods for Laboratory Determination of Water (Moisture) Content of Soil and Rock by Mass.

In certain embodiments, the smectite mineral and/or the second mineral are moler. Moler is a naturally-occurring composite comprising mainly diatomite and the smectite mineral bentonite. Thus, moler may provide both the smectite mineral and the second mineral components of the compositions described herein. The terms "smectite mineral" and "diatomite" therefore both encompass moler. In certain embodiments, compositions comprising moler further comprise an additional smectite, palygorskite, or sepiolite mineral, for example an additional smectite mineral such as bentonite.

When the minerals used in certain embodiments of the present invention are obtained from naturally occurring sources, it may be that some mineral impurities will inevitably contaminate the ground material. In general, however, each mineral component will preferably contain less than 5% by weight, preferably less than 1% by weight of other mineral impurities.

The smectite, palygorskite, or sepiolite mineral and/or the second mineral (e.g. diatomite) may, for example, be processed before or after it is combined with the other components of the compositions described herein in order to obtain a desired particle size. Processing may, for example, comprise crushing, grinding, milling and/or sieving.

The smectite, palygorskite, or sepiolite mineral in the compositions described herein may, for example, have a $d_{90}$ equal to or greater than about 30 μm. For example, the smectite, palygorskite, or sepiolite mineral may have a $d_{90}$ equal to or greater than about 40 μm or equal to or greater than about 50 μm or equal to or greater than about 60 μm or equal to or greater than about 70 μm or equal to or greater than about 80 μm. The smectite, palygorskite, or sepiolite mineral in the compositions described herein may, for example, have a $d_{90}$ equal to or less than about 150 μm. For example, the smectite, palygorskite, or sepiolite mineral may have a $d_{90}$ equal to or less than about 140 μm or equal to or less than about 130 μm or equal to or less than about 120 μm. For example, the smectite, palygorskite, or sepiolite mineral may have a $d_{90}$ ranging from about 30 μm to about 150 μm, for example from about 50 μm to about 140 μm, for example from about 60 μm to about 120 μm.

The smectite, palygorskite, or sepiolite mineral in the compositions described herein may, for example, have a $d_{50}$ equal to or greater than about 5 µm. For example, the smectite, palygorskite, or sepiolite mineral may have a $d_{50}$ equal to or greater than about 10 µm or equal to or greater than about 15 µm. The smectite, palygorskite, or sepiolite mineral in the compositions described herein may, for example, have a $d_{50}$ equal to or less than about 60 µm. For example, the smectite, palygorskite, or sepiolite mineral may have a $d_{50}$ equal to or less than about 55 µm or equal to or less than about 50 µm or equal to or less than about 45 µm or equal to or less than about 40 µm or equal to or less than about 35 µm or equal to or less than about 30 µm. For example, the smectite, palygorskite, or sepiolite mineral may have a $d_{50}$ ranging from about 5 µm to about 60 µm, for example from about 10 µm to about 50 µm, for example from about 15 µm to about 40 µm.

The smectite, palygorskite, or sepiolite mineral in the compositions described herein may, for example, have a $d_{10}$ equal to or greater than about 0.1 µm. For example, the smectite, palygorskite, or sepiolite mineral may have a $d_{10}$ equal to or greater than about 0.5 µm or equal to or greater than about 1 µm or equal to or greater than about 1.5 µm or equal to or greater than about 2 µm. The smectite, palygorskite, or sepiolite mineral in the compositions described herein may, for example, have a $d_{10}$ equal to or less than about 10 µm. For example, the smectite, palygorskite, or sepiolite mineral may have a $d_{10}$ equal to or less than about 8 µm or equal to or less than about 6 µm or equal to or less than about 5 µm. For example, the smectite, palygorskite, or sepiolite mineral may have a $d_{10}$ ranging from about 0.1 µm to about 10 µm, for example from about 1 µm to about 8 µm, for example from about 2 µm to about 6 µm.

The second mineral (e.g. diatomite) in the compositions described herein may, for example, have a $d_{90}$ equal to or greater than about 10 µm. For example, the second mineral may have a $d_{90}$ equal to or greater than about 20 µm or equal to or greater than about 30 µm or equal to or greater than about 40 µm or equal to or greater than about 50 µm or equal to or greater than about 60 µm or equal to or greater than about 70 µm or equal to or greater than about 80 µm. The second mineral in the compositions described herein may, for example, have a $d_{90}$ equal to or less than about 150 µm. For example, the second mineral may have a $d_{90}$ equal to or less than about 140 µm or equal to or less than about 130 µm or equal to or less than about 120 µm. For example, the second mineral may have a $d_{90}$ ranging from about 10 µm to about 150 µm, for example from about 50 µm to about 140 µm, for example from about 60 µm to about 120 µm.

The second mineral (e.g. diatomite) in the compositions described herein may, for example, have a $d_{50}$ equal to or greater than about 6 µm. For example, the second mineral may have a $d_{50}$ equal to or greater than about 10 µm or equal to or greater than about 15 µm or equal to or greater than about 20 µm. The second mineral in the compositions described herein may, for example, have a $d_{50}$ equal to or less than about 100 µm. For example, the second mineral may have a $d_{50}$ equal to or less than about 90 µm or equal to or less than about 80 µm or equal to or less than about 70 µm or equal to or less than about 60 µm or equal to or less than about 50 µm or equal to or less than about 40 µm or equal to or less than about 30 µm. For example, the second mineral may have a $d_{50}$ ranging from about 6 µm to about 100 µm, for example from about 10 µm to about 80 µm, for example from about 10 µm to about 60 µm, for example from about 10 µm to about 50 µm, for example from about 15 µm to about 40 µm.

The second mineral (e.g. diatomite) in the compositions described herein may, for example, have a $d_{10}$ equal to or greater than about 2 µm. For example, the second mineral may have a $d_{10}$ equal to or greater than about 5 µm or equal to or greater than about 10 µm. The second mineral in the compositions described herein may, for example, have a $d_{10}$ equal to or less than about 35 µm. For example, the second mineral may have a $d_{10}$ equal to or less than about 30 µm or equal to or less than about 25 µm or equal to or less than about 20 µm. For example, the second mineral may have a $d_{10}$ ranging from about 2 µm to about 35 µm, for example from about 5 µm to about 25 µm, for example from about 5 µm to about 20 µm.

The smectite, palygorskite, or sepiolite mineral in the compositions described herein may, for example, have a specific surface area (SSA) equal to or greater than about 40 $m^2/g$. For example, the smectite, palygorskite, or sepiolite mineral may have a SSA equal to or greater than about 50 $m^2/g$ or equal to or greater than about 60 $m^2/g$ or equal to or greater than about 70 $m^2/g$ or equal to or greater than about 80 $m^2/g$ or equal to or greater than about 90 $m^2/g$ or equal to or greater than about 100 $m^2/g$ or equal to or greater than about 110 $m^2/g$ or equal to or greater than about 120 $m^2/g$ or equal to or greater than about 130 $m^2/g$ or equal to or greater than about 140 $m^2/g$ or equal to or greater than about 150 $m^2/g$. The smectite, palygorskite, or sepiolite mineral in the compositions described herein may, for example, have a SSA equal to or less than about 300 $m^2/g$. For example, the smectite, palygorskite, or sepiolite mineral may have a SSA equal to or less than about 280 $m^2/g$ or equal to or less than about 260 $m^2/g$ or equal to or less than about 250 $m^2/g$ or equal to or less than about 240 $m^2/g$ or equal to or less than about 220 $m^2/g$ or equal to or less than about 200 $m^2/g$. For example, the smectite, palygorskite, or sepiolite mineral may have a SSA ranging from about 40 $m^2/g$ to about 300 $m^2/g$, for example from about 50 $m^2/g$ to about 250 $m^2/g$, for example from about 100 $m^2/g$ to about 250 $m^2/g$, for example from about 120 $m^2/g$ to about 220 $m^2/g$.

The second mineral (e.g. diatomite) in the compositions described herein may, for example, have a specific surface area (SSA) equal to or greater than about 2 $m^2/g$. For example, the second mineral may have a SSA equal to or greater than about 5 $m^2/g$ or equal to or greater than about 10 $m^2/g$ or equal to or greater than about 20 $m^2/g$ or equal to or greater than about 30 $m^2/g$ or equal to or greater than about 40 $m^2/g$ or equal to or greater than about 50 $m^2/g$ or equal to or greater than about 60 $m^2/g$ or equal to or greater than about 70 $m^2/g$ or equal to or greater than about 80 $m^2/g$ or equal to or greater than about 90 $m^2/g$ or equal to or greater than about 100 $m^2/g$. The second mineral in the compositions described herein may, for example, have a SSA equal to or less than about 300 $m^2/g$. For example, the second mineral may have a SSA equal to or less than about 280 $m^2/g$ or equal to or less than about 260 $m^2/g$ or equal to or less than about 250 $m^2/g$ or equal to or less than about 240 $m^2/g$ or equal to or less than about 220 $m^2/g$ or equal to or less than about 200 $m^2/g$. For example, the second mineral may have a SSA ranging from about 2 $m^2/g$ to about 300 $m^2/g$, for example from about 10 $m^2/g$ to about 250 $m^2/g$, for example from about 50 $m^2/g$ to about 250 $m^2/g$, for example from about 100 $m^2/g$ to about 220 $m^2/g$.

The smectite, palygorskite, or sepiolite mineral in the compositions described herein may, for example, have a pore volume equal to or greater than about 0.1 $cm^3/g$. For example, the smectite, palygorskite, or sepiolite mineral may have a pore volume equal to or greater than about 0.2 $cm^3/g$ or equal to or greater than about 0.3 $cm^3/g$ or equal to or greater than about 0.4 $cm^3/g$. The smectite, palygorskite, or sepiolite mineral in the compositions described herein may, for example, have a pore volume equal to or less than about 0.9 $cm^3/g$. For example, the smectite, palygorskite, or sepiolite mineral may have a pore volume equal to or less than about 0.8 $cm^3/g$ or equal to or less than about 0.7 $cm^3/g$ or equal to or less than about 0.6 $cm^3/g$ or equal to or less than about 0.5 $cm^3/g$ or equal to or less than about 0.4 $cm^3/g$. For example, the smectite, palygorskite, or sepiolite mineral may have a pore volume ranging from about 0.1 $cm^3/g$ to about 0.9 $cm^3/g$, for example from about 0.2 $cm^3/g$ to about 0.7 $cm^3/g$, for example from about 0.3 $cm^3/g$ to about 0.5 $cm^3/g$, for example from about 0.35 $cm^3/g$ to about 0.45 $cm^3/g$.

The second mineral (e.g. diatomite) in the compositions described herein may, for example, have a pore volume equal to or greater than about 0.001 $cm^3/g$. For example, the second mineral in the compositions described herein may have a pore volume equal to or greater than about 0.01 $cm^3/g$ or equal to or greater than about 0.1 $cm^3/g$ or equal to or greater than about 0.2 $cm^3/g$ or equal to or greater than about 0.3 $cm^3/g$ or equal to or greater than about 0.4 $cm^3/g$. The second mineral in the compositions described herein may, for example, have a pore volume equal to or less than about 0.9 $cm^3/g$. For example, the second mineral in the compositions described herein may have a pore volume equal to or less than about 0.8 $cm^3/g$ or equal to or less than about 0.7 $cm^3/g$ or equal to or less than about 0.6 $cm^3/g$ or equal to or less than about 0.5 $cm^3/g$. For example, the second mineral in the compositions described herein may have a pore volume ranging from about 0.001 $cm^3/g$ to about 0.9 $cm^3/g$, for example from about 0.01 $cm^3/g$ to about 0.9 $cm^3/g$, for example from about 0.1 $cm^3/g$ to about 0.8 $cm^3/g$, for example from about 0.2 $cm^3/g$ to about 0.8 $cm^3/g$, for example from about 0.3 $cm^3/g$ to about 0.6 $cm^3/g$.

The smectite, palygorskite, or sepiolite mineral in the compositions described herein may, for example, have an average pore size equal to or greater than about 2 nm. For example, the smectite, palygorskite, or sepiolite mineral may have an average pore size equal to or greater than about 10 nm or equal to or greater than about 50 nm or equal to or greater than about 100 nm or equal to or greater than about 150 nm. The smectite, palygorskite, or sepiolite mineral in the compositions described herein may, for example, have an average pore size equal to or less than about 400 nm. For example, the smectite, palygorskite, or sepiolite mineral may have an average pore size equal to or less than about 380 nm or equal to or less than about 360 nm or equal to or less than about 350 nm. For example, the smectite, palygorskite, or sepiolite mineral may have an average pore size ranging from about 2 nm to about 400 nm, for example from about 50 nm to about 380 nm, for example from about 100 nm to about 350 nm.

The second mineral (e.g. diatomite) in the compositions described herein may, for example, have an average pore size equal to or greater than about 2 nm. For example, the second mineral may have an average pore size equal to or greater than about 10 nm or equal to or greater than about 50 nm or equal to or greater than about 100 nm or equal to or greater than about 150 nm. The second mineral in the compositions described herein may, for example, have an average pore size equal to or less than about 25 µm. For example, the second mineral may have an average pore size equal to or less than about 20 µm or equal to or less than about 10 µm or equal to or less than about 1 µm or equal to or less than about 500 nm or equal to or less than about 400 nm. For example, the second mineral may have an average pore size ranging from about 2 nm to about 25 µm, for example from about 50 nm to about 10 µm, for example from about 100 nm to about 1 µm.

The compositions described herein comprise synthetic amorphous silica dispersed on the surface of at least one of the smectite, palygorskite, or sepiolite mineral and the second mineral. In certain embodiments, the synthetic amorphous silica is dispersed on the surface of both the smectite, palygorskite, or sepiolite mineral and the second mineral.

The term "synthetic amorphous silica" refers to silica that is not naturally occurring and is not crystalline. Synthetic amorphous silica may be formed from a precipitation reaction, usually involving silicic acid. In certain embodiments, the synthetic amorphous silica (e.g. silica gel) used in the compositions described herein is an adsorbent. In certain embodiments, the synthetic amorphous silica (e.g. silica gel) used in the compositions described herein is not a binder.

In certain embodiments, synthetic amorphous silica may be formed at temperatures higher than 85° C. and under alkaline conditions (e.g. pH ranging from about 9 to about 11). Primary particles are rapidly grown to have a diameter of approximately 100 nm. These particles then aggregate by flocculation. This may be referred to as precipitated silica.

In certain embodiments, synthetic amorphous silica may be formed by polymerization of monomeric silicic acid to form a 3D gel structure. This material may be referred to as "silica gel". Silica gel is generally formed in a wet precipitation process involving a silicate solution and an acid, for example a mineral acid. Thus, in certain embodiments, the synthetic amorphous silica is silica gel. Silica gel generally has a more porous structure and a higher internal surface area than other synthetic amorphous silicas.

In certain embodiments, the compositions described herein further comprise free particles of synthetic amorphous silica. By "free" it is meant that the particles are not dispersed on the surface of the smectite, palygorskite, or sepiolite mineral or second mineral and are not associated with the mineral particles in any way. The free particles may, for example, be formed at the same time as the synthetic amorphous silica that is dispersed on the surface of the mineral(s) or may be added separately. The free particles of synthetic amorphous silica may, for example, aggregate to form larger particles. The free particles of silica gel and aggregates thereof may, for example, have a $d_{99}$ (99 vol % of particles having a size less than) equal to or less than about 50 µm. For example, the free particles of silica gel and aggregates thereof may have a $d_{99}$ equal to or less than about 40 µm, for example equal to or less than about 30 µm, for example equal to or less than about 20 µm.

The various components of the compositions described herein may be combined in any suitable amounts and ratios, for example any suitable amounts and ratios such that the total amounts to 100 wt %.

In certain embodiments, the composition described herein comprises equal to or greater than about 50 wt % of the smectite, palygorskite, or sepiolite mineral. For example, the composition may comprise equal to or greater than about 55 wt % or equal to or greater than about 60 wt % or equal to or greater than about 65 wt % or equal to or greater than about 70 wt % or equal to or greater than about 75 wt % of the smectite, palygorskite, or sepiolite mineral. In certain embodiments, the composition described herein may comprise equal to or less than about 98 wt % of the smectite, palygorskite, or sepiolite mineral. For example, the composition may equal to or less than about 95 wt % or equal to or less than about 90 wt % or equal to or less than about 85 wt % or equal to or less than about 80 wt % of the smectite, palygorskite, or sepiolite mineral. For example, the composition may comprise from about 50 wt % to about 98 wt %, for example from about 60 wt % to about 97 wt %, for example from about 70 wt % to about 95 wt %, for example from about 70 wt % to about 90 wt % of the smectite, palygorskite, or sepiolite mineral.

In certain embodiments, the composition described herein comprises equal to or greater than about 1 wt % of the second mineral. For example, the composition may comprise equal to or greater than about 5 wt % or equal to or greater than about 10 wt % or equal to or greater than about 15 wt % or equal to or greater than about 20 wt % of the second mineral. In certain embodiments, the composition comprises equal to or less than about 40 wt % of the second mineral. For example, the composition may comprise equal to or less than about 35 wt % or equal to or less than about 30 wt % or equal to or less than about 25 wt % of the second mineral. For example, the composition may comprise from about 1 wt % to about 40 wt %, for example from about 1 wt % to about 35 wt %, for example from about 5 wt % to about 30 wt %, for example from about 15 wt % to about 25 wt % of the second mineral.

In certain embodiments, the composition described herein comprises equal to or greater than about 1 wt % of the synthetic amorphous silica. For example, the composition may comprise equal to or greater than about 2 wt % or equal to or greater than about 3 wt % or equal to or greater than about 4 wt % or equal to or greater than about 5 wt % of the synthetic amorphous silica. In certain embodiments, the composition comprises equal to or less than about 15 wt % of the synthetic amorphous silica. For example, the composition may comprise equal to or less than about 12 wt % or equal to or less than about 10 wt % or equal to or less than about 8 wt % of the synthetic amorphous silica. For example, the composition may comprise from about 1 wt % to about 15 wt %, for example from about 1 wt % to about 10 wt %, for example from about 2 wt % to about 10 wt %, for example from about 5 wt % to about 12 wt % of the synthetic amorphous silica.

The weight ratio of the smectite, palygorskite, or sepiolite mineral to the second mineral in the composition may, for example, range from about 20:1 to about 1:1. For example, the weight ratio of the smectite, palygorskite, or sepiolite mineral to the second mineral in the composition may range from about 15:1 to about 1:1 or from about 12:1 to about 1:1 or from about 20:1 to about 2:1 or from about 15:1 to about 2:1 or from about 12:1 to about 2:1 or from about 20:1 to about 5:1 or from about 15:1 to about 5:1 or from about 12:1 to about 5:1 or from about 20:1 to about 10:1 or from about 15:1 to about 10:1.

The compositions described herein may, for example, be processed in order to obtain a desired particle size. Processing may, for example, comprise crushing, grinding, milling and/or sieving.

In certain embodiments, at least about 60 wt % of particles in the composition are equal to or smaller than about 75 μm. For example, at least about 65 wt % or at least about 70 wt % or at least about 75 wt % or at least about 80 wt % or at least about 85 wt % or at least about 90 wt % or at least about 95 wt % of particles in the composition may be equal to or smaller than about 75 μm. For example, up to 100 wt % of particles in the composition may be equal to or smaller than about 75 μm. For example, up to about 99 wt % or up to about 98 wt % or up to about 97 wt % of particles in the composition may be equal to or smaller than about 75 μm. For example, from about 60 wt % to about 100 wt %, or from about 70 wt % to about 100 wt %, or from about 80 wt % to about 99 wt % of particles in the composition may be equal to or smaller than about 75 μm.

In certain embodiments, the composition has a $d_{50}$ equal to or less than about 60 μm. For example, the composition may have a $d_{50}$ equal to or less than about 55 μm or equal to or less than about 50 μm or equal to or less than about 45 μm or equal to or less than about 40 μm or equal to or less than about 35 μm or equal to or less than about 30 μm. In certain embodiments, the composition has a $d_{50}$ equal to or greater than about 10 μm.

For example, the composition may have a $d_{50}$ equal to or greater than about 15 μm or equal to or greater than about 20 μm or equal to or greater than about 25 μm. For example, the composition may have a $d_{50}$ ranging from about 10 μm to about 60 μm, for example from about 15 μm to about 50 μm, for example from about 20 μm to about 40 μm.

In certain embodiments, the composition has a $d_{90}$ equal to or less than about 150 μm. For example, the composition may have a $d_{90}$ equal to or less than about 140 μm or equal to or less than about 130 μm or equal to or less than about 120 μm. In certain embodiments, the composition has a $d_{90}$ equal to or greater than about 40 μm. For example, the composition may have a $d_{90}$ equal to or greater than about 50 μm or equal to or greater than about 60 μm or equal to or greater than about 70 μm or equal to or greater than about 80 μm. For example, the composition may have a $d_{90}$ ranging from about 40 μm to about 150 μm, for example from about 50 μm to about 140 μm, for example from about 60 μm to about 130 μm, for example from about 70 μm to about 120 μm.

In certain embodiments, the composition has a $d_{10}$ equal to or less than about 10 μm. For example, the composition may have a $d_{10}$ equal to or less than about 9 μm or equal to or less than about 8 μm or equal to or less than about 7 μm or equal to or less than about 6 μm. In certain embodiments, the composition has a $d_{10}$ equal to or greater than about 1 μm. For example, the composition may have a $d_{10}$ equal to or greater than about 2 μm or equal to or greater than about 3 μm or equal to or greater than about 4 μm. For example, the composition may have a $d_{10}$ ranging from about 1 μm to about 10 μm, for example from about 2 μm to about 8 μm, for example from about 4 μm to about 6 μm.

Particle size properties referred to herein are as measured in a well-known manner by laser light particle size analysis using a CILAS (Compagnie Industrielle des Lasers) 1090 instrument for particles smaller than 500 μm. In this technique, the size of particles in powders, suspensions and emulsions may be measured using the diffraction of a laser beam, based on application of either Fraunhofer or Mie theory. Particles are dispersed in air or water or another solvent stream. The angular variation in intensity of light scattered as a laser beam passes through a dispersed particulate sample. The angular scattering intensity data is then analysed to calculate the size of the particles responsible for creating the scattering pattern. The term "mean particle size" or "$d_{50}$" used herein is the value, determined in this way, of the particle diameter at which there are 50% by weight of the particles which have a diameter less than the $d_{50}$ value. The term $d_{90}$ is the particle size value less than which there are 90% by weight of the particles. The CILAS 1090 instrument normally provides particle size data to two decimal places, to be rounded up or down when determining whether the requirements of the present invention are fulfilled, or by other methods which give essentially the same result. For particles larger than 500 μm, particle size is measured by sieving.

The compositions described herein may, for example, have a moisture content ranging from about 0 wt % to about 25 wt %, for example from about 0 wt % to about 20 wt %, for example from about 0 wt % to about 15 wt %, for example from about 0 wt % to about 10 wt %, for example from about 0 wt % to about 5 wt %. Each component of the compositions described herein may undergo a drying step (e.g. individually or as part of the composition as a whole) in order to obtain a final composition having a moisture content within this range.

The compositions described herein may, for example, have a specific surface area (SSA) equal to or greater than about 100 m$^2$/g. For example, the composition may have a SSA equal to or greater than about 120 m$^2$/g or equal to or greater than about 140 m$^2$/g or equal to or greater than about 150 m$^2$/g or equal to or greater than about 160 m$^2$/g or equal to or greater than about 180 m$^2$/g or equal to or greater than about 200 m$^2$/g. The compositions described herein may, for example, have a SSA equal to or less than about 400 m$^2$/g. For example, the composition may have a SSA equal to or less than about 380 m$^2$/g or equal to or less than about 360 m$^2$/g or equal to or less than about 350 m$^2$/g or equal to or less than about 340 m$^2$/g or equal to or less than about 320 m$^2$/g or equal to or less than about 300 m$^2$/g or equal to or less than about 280 m$^2$/g or equal to or less than about 260 m$^2$/g or equal to or less than about 250 m$^2$/g. For example, the composition may have a SSA ranging from about 100 m$^2$/g to about 400 m$^2$/g or from about 150 m$^2$/g to about 350 m$^2$/g or from about 200 m$^2$/g to about 300 m$^2$/g. Unless otherwise stated, the surface area of the compositions described herein and the individual components of the compositions (i.e. smectite, palygorskite, or sepiolite mineral, second mineral, and synthetic amorphous silica) is determined by nitrogen adsorption (BET) method. The BET surface area may be determined by the method described in Brunauer et al., J. Am. Chem. Soc., 60, p 309, 1938, the contents of which are incorporated herein by reference. Another method for determining the surface area and pore dimensions when the pore size is higher than 400 nm is mercury intrusion porosimetry (MIP). According to MIP principle, the required equilibrated pressure is inversely proportional to the size of the pores. Only low pressures being required to intrude mercury into large macropores, whereas much greater pressures are required to force mercury into small pores. Mercury porosimetry analysis is the progressive intrusion of mercury into a porous structure under stringently controlled pressures. From the pressure versus intrusion data, the instrument generates volume and size distributions using the Washburn equation. (www.micromeritics.com).

The compositions described herein may, for example, have a pore volume equal to or greater than about 0.05 cm$^3$/g. For example, the composition may have a pore volume equal to or greater than about 0.1 cm$^3$/g or equal to or greater than about 0.15 cm$^3$/g or equal to or greater than about 0.2 cm$^3$/g or equal to or greater than about 0.25 cm$^3$/g or equal to or greater than about 0.3 cm$^3$/g. The compositions described herein may, for example, have a pore volume equal to or less than about 0.9 cm$^3$/g. For example, the compositions described herein may have a pore volume equal to or less than about 0.85 cm$^3$/g or equal to or less than about 0.8 cm$^3$/g or equal to or less than about 0.75 cm$^3$/g or equal to or less than about 0.7 cm$^3$/g or equal to or less than about 0.65 cm$^3$/g or equal to or less than about 0.6 cm$^3$/g or equal to or less than about 0.55 cm$^3$/g or equal to or less than about 0.5 cm$^3$/g. For example, the compositions described herein may have a pore volume ranging from about 0.0.5 cm$^3$/g to about 0.9 cm$^3$/g or from about 0.1 cm$^3$/g to about 0.5 cm$^3$/g.

The compositions described herein may, for example, have an average pore size equal to or greater than about 20 nm. For example, the composition may have an average pore size equal to or greater than about 30 nm or equal to or greater than about 40 nm or equal to or greater than about 50 nm or equal to or greater than about 60 nm or equal to or greater than about 70 nm or equal to or greater than about 80 nm. The compositions described herein may, for example, have an average pore size equal to or less than about 200 nm. For example, the composition may have an average pore size equal to or less than about 190 nm or equal to or less than about 180 nm or equal to or less than about 170 nm or equal to or less than about 160 nm or equal to or less than about 150 nm. For example, the composition may have an average pore size ranging from about 20 nm to about 200 nm or from about 50 nm to about 150.

Pore size properties (e.g. pore volume and average pore size) are measured using the cylindrical shape assumption (4V/A), which is part of the BJH (Barrett-Joyner-Halenda) model. The BJH model is derived from the same N2 absorption isotherm that is used for BET surface area calculation (measurement according to the BET method, AFNOR standard X11-621 and 622 or ISO 9277). The BJH model is described in Barrett et al., Am. Chem. Soc., 73 (1951), pages 373 to 380, the contents of which are incorporated herein by reference. A Micromeritics TRISTAR 3000, Micromeritics VACPREP 061, or a Sorptomatic 1990 Fisons instrument may, for example, be used. The samples may, for example, be degassed in an oven overnight at 105° C., followed by 180° C. for 30 minutes under nitrogen flow and cooling for 30 minutes under nitrogen flow or at 120° C. for 5 hours under nitrogen flow. The isotherm may, for example, be measured for relative pressures P/P$_0$ ranging from 0.05 to 0.98. Average pore size refers to pore diameter. Pore volume is cumulative and obtained by BJH on the desorption branch for pore sizes between 1.7 and 50 nm.

The compositions described herein may, for example, have a filterability equal to or greater than about 0.01 Darcy. For example, the compositions described herein may have a filterability equal to or greater than about 0.02 Darcy or equal to or greater than about 0.03 Darcy or equal to or greater than about 0.04 Darcy or equal to or greater than about 0.05 Darcy. The compositions described herein may, for example, have a filterability equal to or less than about 4 Darcy. For example, the compositions described herein may have a filterability equal to or less than about 3 Darcy or equal to or less than about 2 Darcy or equal to or less than about 1 Darcy. For example, the compositions described herein may have a filterability ranging from about 0.01 Darcy to about 4 Darcy, for example from about 0.02 Darcy to about 2 Darcy, for example from about 0.03 Darcy to about 1 Darcy.

Filterability is related to permeability that is measured by using a device designed to form a filter cake on a septum from a suspension of the composition material in water, and then measuring the time required for a specified volume of water to flow through a measured thickness of filter cake of known cross-sectional area. For example, the permeability may be measured through a porous of composition material 1 cm high and with a 1 cm$^2$ section through which flows a fluid with viscosity of 1 mPa·s with a flow rate of 1 cm$^3$/sec under an applied pressure differential of 1 atmosphere. The principles for measuring filterability have been previously derived for porous media from Darcy's law (see, for example, J. Bear, "The Equation of Motion of a Homogeneous Fluid: Derivations of Darcy's Law", in Dynamics of Fluids in Porous Media 161-177 (2$^{nd}$ ed. 1988)).

Methods of Making the Mineral Compositions

There is also provided herein a method for making a composition, the method comprising forming synthetic amorphous silica on at least one of a smectite, palygorskite, or sepiolite mineral, and a second mineral, such that the synthetic amorphous silica is dispersed on the surface of the smectite, palygorskite, or sepiolite mineral and/or the second mineral.

In certain embodiments, the method comprises precipitating synthetic amorphous silica on at least one of a smectite, palygorskite, or sepiolite mineral, and a second mineral, such that the synthetic amorphous silica is dispersed on the surface of the smectite, palygorskite, or sepiolite mineral and/or the second mineral.

The details specified above in relation to the compositions and the components thereof may be applicable to the methods described herein. In particular, the composition made by the methods described herein is a composition in accordance with any aspect or embodiment described herein.

In certain embodiments, the method comprises forming the synthetic amorphous silica on the surface of both of the smectite, palygorskite, or sepiolite mineral and the second mineral.

In certain embodiments, the method comprises forming the synthetic amorphous silica on the surface of the smectite, palygorskite, or sepiolite mineral. The method may further comprise combining the smectite, palygorskite, or sepiolite mineral having synthetic amorphous silica dispersed on its surface with a second mineral. The second mineral may, for example, have synthetic amorphous silica dispersed on its surface.

In certain embodiments, the method comprising forming the synthetic amorphous silica on the surface of the second mineral. The method may further comprise combining the second mineral having synthetic amorphous silica dispersed on its surface with a smectite, palygorskite, or sepiolite mineral. The smectite, palygorskite, or sepiolite mineral may, for example, have synthetic amorphous silica dispersed on its surface.

In certain embodiments, the method comprises combining the smectite, palygorskite, or sepiolite mineral and/or the second mineral with an acid. This may, for example, result in an acid-treated mineral. The mineral(s) may, for example, be combined with the acid before the mineral(s) are combined with a silicate. For example, the mineral(s) may be combined and then left for a period of time sufficient to enable the mineral particles to react with the acid, for example from about 30 minutes to about 7 days, for example between about 3 hours and about 6 hours. The mineral and acid mixture may, for example, be left at ambient temperature, or alternatively heat up to about 100° C., for example up to about 70° C. may be applied.

The acid may, for example, be an organic acid (e.g. acetic acid, oxalic acid, citric acid) or a mineral acid (e.g. hydrochloric acid, nitric acid, phosphoric acid, sulphuric acid, boric acid, hydrofluoric acid, hydrobromic acid, perchloric acid, hydroiodic acid). The acid may, for example, be sulphuric acid or hydrochloric acid. The acid may, for example, be a strong acid (an acid that completely dissociates in aqueous solution). The acid may, for example, have a concentration equal to or greater than about 5 N. For example, the acid may have a concentration equal to or greater than about 6 N or equal to or greater than about 7 N or equal to or greater than about 8 N or equal to or greater than about 9 N or equal to or greater than about 10 N. The acid may, for example, have a concentration equal to or less than about 30 N. For example, the acid may have a concentration equal to or less than about 28 N or equal to or less than about 26 N or equal to or less than about 25 N or equal to or less than about 24 N or equal to or less than about 22 N or equal to or less than about 20 N. For example, the acid may have a concentration ranging from about 5 N to about 30 N or from about 6 N to about 25 N or from about 7 N to about 20 N or from about 8 N to about 15 N.

In certain embodiments, the method comprises combining an acid with a silicate. In certain embodiments, the method comprises combining the smectite, palygorskite, or sepiolite mineral and/or the second mineral with a silicate, for example a silicate solution. The silicate may, for example, be a metasilicate, orthosilicate, or pyrosilicate. The silicate may, for example, be an alkali metal silicate (e.g. lithium, sodium, potassium, rubidium, caesium, or francium silicate). The silicate may, for example, have the formula $(xM_2O_y SiO_2)*(nH_2O)$, where M is sodium, potassium, or lithium, x is 1 to 3, y is 1 to 3, and n is 0 to 10. For example, the silicate may be sodium silicate, also referred to as waterglass $(Na_2O_y SiO_2)*(nH_2O)$.

Alternatively or additionally, the smectite, palygorskite, or sepiolite mineral and/or the second mineral comprise amorphous silica and the amorphous silica in the mineral is reacted with an alkali in order to form a silicate. The alkali may, for example, be a hydroxide. The alkali may, for example, be sodium hydroxide. Where a silicate is formed by reacting amorphous silica in one or more minerals with an alkali, the method may or may not further comprise combining the acid and/or the smectite, palygorskite, sepiolite mineral and/or the second mineral with an additional silicate.

In certain embodiments, the smectite, palygorskite, or sepiolite mineral and/or the second mineral comprises equal to or greater than about 2 wt % of an amorphous silica phase. Where no additional silicate is added, the smectite, palygorskite, or sepiolite mineral and/or the second mineral may comprise equal to or greater than about 5 wt % of an amorphous silica phase, for example equal to or greater than about 10 wt % or equal to or greater than about 15 wt % of an amorphous silica phase. In certain embodiments, the smectite, palygorskite, or sepiolite mineral and/or the second mineral comprises equal to or less than about 30 wt % of an amorphous silica phase, for example equal to or less than about 25 wt % of an amorphous silica phase. For example, the smectite, palygorskite, or sepiolite mineral and/or the second mineral may comprise from about 5 wt % to about 30 wt % or from about 10 wt % to about 25 wt % of an amorphous silica phase.

Without wishing to be bound by theory, it is thought that the reaction of an acid and a silicate results in the formation of synthetic amorphous silica dispersed on the surface of the smectite, palygorskite, or sepiolite mineral and/or the second mineral. The reaction of the acid and the silicate may take place under acidic conditions. In other words, the silicate may be combined with the mineral and acid in an amount such that the pH of the resulting composition is acidic. The reaction of the acid and the silicate may, for example, may take place at a pH equal to or greater than about 1.5, for example equal to or greater than about 2, for example equal to or greater than about 2.5, for example equal to or greater than about 3 or equal to or greater than about 3.5 or equal to or greater than about 4. The reaction of the acid and the silicate may, for example, take place at a pH ranging from about 2.5 to about 7, or from about 3 to about 6.5, or about 3.5 to about 6.

The reaction of the acid and silicate may, for example, take place at a temperature equal to or less than about 85° C. For example, the reaction of the acid and silicate may take place at a temperature equal to or less than about 80° C. or equal to or less than about 70° C. or equal to or less than about 60° C. or equal to or less than about 50° C. or equal to or less than about 40° C. or equal to or less than about 35° C. or equal to or less than about 30° C. or equal to or less than about 25° C. The reaction of the acid and silicate may, for example, take place at a temperature equal to or greater than about 10° C. For example, the reaction of the acid and silicate may take place at a temperature ranging from about 10° C. to about 85° C., for example from about 10° C. to about 60° C., for example from about 10° C. to about 40° C., for example from about 10° C. to about 30° C., for example from about 10° C. to about 25° C.

The acid may, for example, be combined with the smectite, palygorskite, or sepiolite mineral and/or the second mineral before or after the silicate. Alternatively, the acid and silicate may be combined with the smectite, palygorskite, or sepiolite mineral and/or the second mineral simultaneously. Where the silicate is formed by reacting an amorphous silica phase in a mineral with alkali, the acid may be combined with the smectite, palygorskite, or sepiolite mineral and/or the second mineral after the silicate. Additional acid and/or silicate may be combined with the smectite, palygorskite, or sepiolite mineral and/or the second mineral after an initial combination of acid and silicate with the smectite, palygorskite, or sepiolite mineral and/or the second mineral.

The ratio of the total amount of mineral (weight in g) to acid (volume in mL) may, for example, be equal to or less than about 5:1. For example, the ratio of mineral (g) to acid (mL) may be equal to or less than about 4:1 or equal to or less than about 3:1 or equal to or less than about 2:1 or equal to or less than about 1:1. The ratio of mineral to acid may, for example, be equal to or greater than about 0.1:1, for example equal to or greater than about 0.5:1. The ratio of mineral to acid may, for example, range from about 0.5:1 to about 2:1, for example from about 0.5:1 to about 1.5:1.

The ratio of the total amount of mineral (weight in g) to silicate (weight in g) may, for example, be equal to or less than about 20:1. For example, the ratio of mineral to silicate may be equal to or less than about 15:1 or equal to or less than about 10:1 or equal to or less than about 5:1. The ratio of mineral to silicate may, for example, be equal to or greater than about 1:1, for example equal to or greater than about 2:1. The ratio of mineral to silicate may, for example, range from about 1:1 to about 20:1, for example from about 2:1 to about 5:1.

The mineral(s) may, for example, be combined with the acid and/or silicate and/or any other component, including other mineral(s), by mixing, for example using extrusion and/or kneading or any other kind of mixing such as mortar mixer. The mineral(s) may, for example, be combined with the acid and/or silicate and/or any other component by spraying solutions of the acid and/or silicate.

The method may, for example, comprise one or more washing steps. For example, the mineral(s) may be washed with water after the reaction with an acid but before reaction with a silicate. Alternatively or additionally, the mineral(s) may be washed with water after the reaction of an acid and a silicate. The washing steps may, for example, result in an acidic effluent, which may, for example, be recycled so that it can be used again in the process. The washing steps may, for example, assist with increasing the pH of the reaction mixture, for example such that the pH of the reaction mixture is equal to or greater than about 2 or equal to or greater than about 2.5 or equal to or greater than about 3 or equal to or greater than about 3.5 or equal to or greater than about 4.

After the synthetic amorphous silica has formed such that it is dispersed on the surface of the smectite, palygorskite, or sepiolite mineral and/or the second mineral, the product may be combined, for example mixed, with one or more further components (e.g. a smectite, palygorskite, or sepiolite mineral or a second mineral or any further minerals or additional synthetic amorphous silica), for example by mixing.

The product may then be dried such that it has a moisture content equal to or less than about 25 wt %. For example, the product may be dried such that it has a moisture content equal to or less than about 20 wt % or equal to or less than about 15 wt % or equal to or less than about 10 wt % or equal to or less than about 8 wt % or equal to or less than about 6 wt % or equal to or less than about 5 wt % or equal to or less than about 4 wt % or equal to or less than about 2 wt % or equal to or less than about 1 wt %. The product may, for example, be dried such that it has a moisture content equal to or greater than 0 wt %. The product may, for example, be calcined.

The product may, for example, be milled to obtain a desired particle size.

Uses of the Mineral Compositions

The mineral compositions described herein and made by the methods described herein may, for example, be used for the purification of a liquid. For example, the mineral compositions may be used for bleaching and/or filtering a liquid.

The liquid may, for example, be a non-aqueous liquid such as an oil. The oil may, for example, be an edible oil, an industrial oil, or biodiesel. The edible oil may, for example, be canola oil, soybean oil, sunflower oil, corn oil, olive oil, fish oil, or a combination of one or more thereof.

EXAMPLES

Example 1

The starting raw material is calcium bentonite (Calcium Montmorillonite or Ca-M). Granular calcium bentonite (with its natural moisture content: about 27% to about 35%) is sprinkled by a highly concentrated solution (about 7 N to about 12 N) of a mineral acid such as $H_2SO_4$ or HCl at an indicative solid/liquid ratio 1:0.85 or even lower (for example 1:1 or 1:1.2). Plastic paste is then extruded and left at ambient temperature for sufficient time to allow the acid to react with clay particles. Alternatively, heating up to 100° C. may be applied. Then, a waterglass liquid, hereinafter described as $(xM_2O_ySiO_2)*(nH_2O)$ (M is Na, K, or Li) is added to the acid-matured bentonite and the mixture is extruded again or well mixed and kneaded in a pan roller mill or similar so the $(xM_2O_ySiO_2)*(nH_2O)$ reaches as many clay particles as possible. Liquid $(xM_2O_ySiO_2)*(nH_2O)$ may be added in a high amount so that the paste becomes a very thick, viscous slurry. At the final stage the neutralized output (paste or thick slurry) is stored for maturation for sufficient time. The amount of added alkaline compound is adjusted so the pH of the final material is higher than or equal to 2.5. This product is named (A). Then (A) is blended with diatomaceous earth (DE) which is already coated with silica gel, which is named (B). The blend of (A) and (B) is dried to a moisture content of about 5 to about 20%, milled so that 80% w/w of particles are less than 75 microns. This may be referred to as a "semidry" process.

In a variation of the above process, the product (A) is washed out with water to increase the pH above 2.5 and the slurry is left to sediment in a thickening tank. Sediment is then filtered in order to obtain the product (A) with a pH greater than 2.5, while the acid effluent (enriched with fresh mineral acid) is used to pre-activate fresh incoming batch of Ca-M through initial spraying.

In another variation of the above process, washing with water takes place after acid maturation of the bentonite paste and before the addition of $(xM_2O_ySiO_2)*(nH_2O)$. In this case, the pH before addition of $(xM_2O_ySiO_2)*(nH_2O)$ is lower than 3, in the region of about 0.5 to about 2.5. The acid effluent is again used to pre-activate fresh incoming batch of Ca-M through initial spraying.

In another variation of this method, the bentonite is added in milled form, for example with a particle size where 80% of particles are smaller than 75 μm, or in a combination of granular and milled form.

A schematic diagram of the methods used in Example 1 is shown in FIG. 1. Products in accordance with the invention may be made by this method.

Example 2

The starting raw material is a calcium bentonite containing an amount of amorphous silica phase (for example containing a greater amount of amorphous silica phase and less crystalline phase compared to the starting material used in Example 1). Granular calcium bentonite with its natural moisture content of about 27% to about 35% is mixed with sodium hydroxide (NaOH) solution for a few hours to transform the amorphous silica phase into a $(xM_2O_ySiO_2)*(nH_2O)$ (M is Na, K, or Li) and colloidal $Al(OH)_3$. Commercially available $(xM_2O_ySiO_2)*(nH_2O)$ is not added externally or, if necessary, is added at a lower amount compared to the method described in Example 1. Thus product (A) may contain some silica-alumina gel in addition to silica gel. The next steps of this synthesis route are similar to synthesis route described in Example 1 and involve addition of acid and optionally further silicate to form product (A). The optional washing steps described in Example 1 may also be employed in Example 2.

Figure 2:
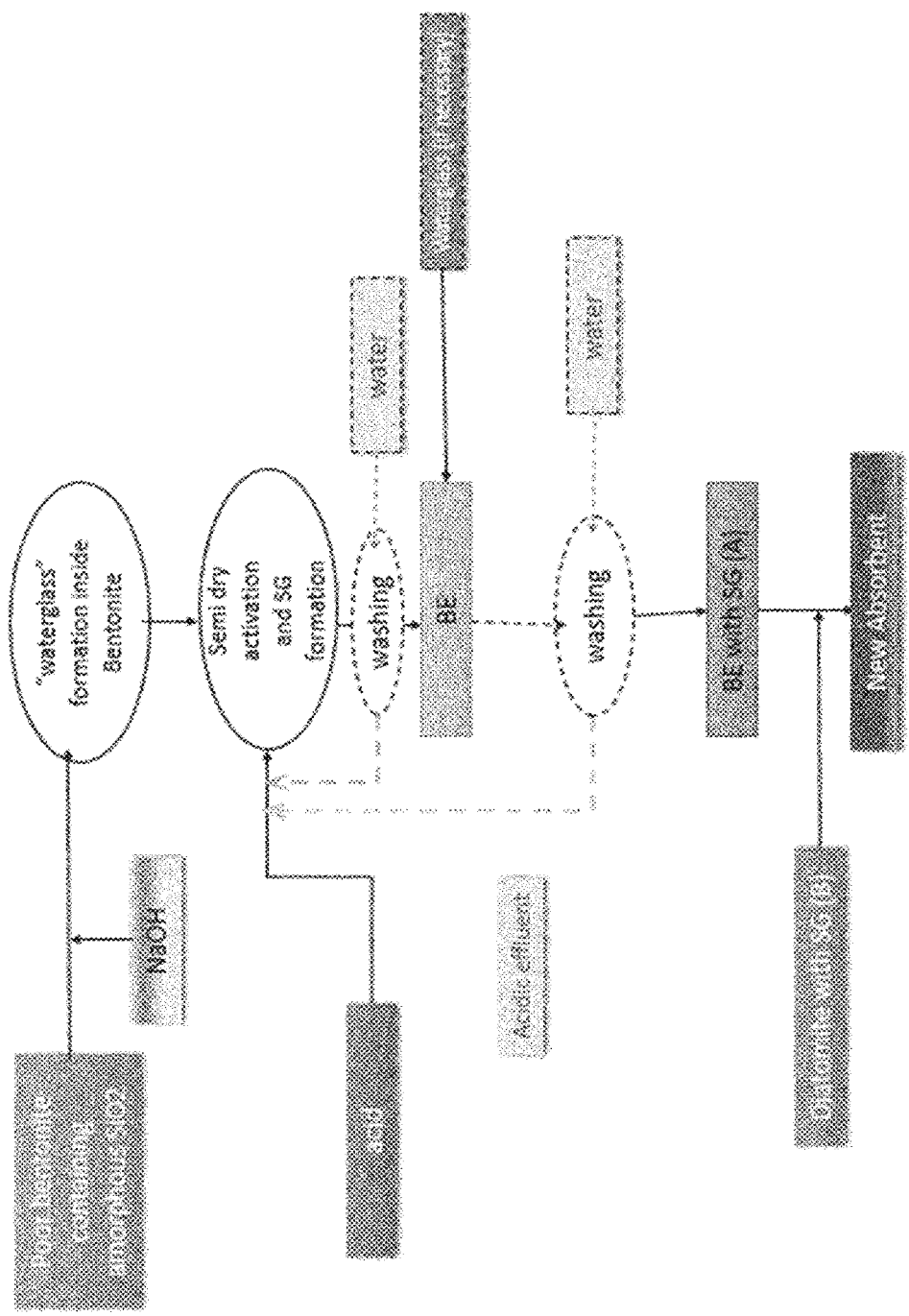
FIG. 2 is a schematic diagram of the method described in Example 2.

A schematic diagram of the methods used in Example 2 is shown in FIG. 2. Products in accordance with the invention may be made by this method.

Example 3

The starting raw material is diatomaceous earth (DE) or moler (a naturally occurring composite of intercalated montmorillonite with diatoms). The DE or Moler is sprinkled by or mixed with liquid $(xM_2O_ySiO_2)*(nH_2O)$ (M is Na, K, or Li) at an indicative solid/liquid ratio of 1:1.3 and the paste is extruded or kneaded in a roller pan mill or similar so that the liquid $(xM_2O_ySiO_2)*(nH_2O)$ reaches as many clay particles and diatoms as possible. Liquid $(xM_2O_ySiO_2)*(nH_2O)$ may be added at a high amount so the paste becomes a very thick, viscous slurry. At the final stage the output (paste or thick slurry) is optionally stored for maturation for sufficient time. At the next stage Ca-M granules with their natural moisture content of about 27% to about 35% may be added to the DE or Moler and $(xM_2O_ySiO_2)*(nH_2O)$ composite simultaneously with a highly concentrated solution (about 7 to about 12 N) of a mineral acid such as $H_2SO_4$ or HCl. The solid/liquid ratio of Ca-M to mineral acid may be 1:1 or lower. The new composite containing 1) DE or Moler, 2) $(xM_2O_ySiO_2)*(nH_2O)$, 3) optionally Calcium bentonite and 4) mineral acid (paste or thick slurry) is extruded or kneaded and then matured for sufficient time at ambient temperature. Alternatively, the composite can be also slightly heated at about 40° C. to about 70° C. This final stage may be referred to as "semi dry activation combined with intrinsically formed silica gel". Following maturation, the paste is dried to about 5% to about 20% final moisture and milled so as 80% w/w of particles are smaller than 75 microns.

In a variation of this process, additional silica gel might be added together with liquid $(xM_2O_ySiO_2)*(nH_2O)$ or immediately after extrusion or mixing in the roller pan mill.

In another variation of this method, the bentonite is added in milled form, for example with a particle size such that 80% of particles are smaller than 75 μm, or in a combination of granular and milled form.

In another variation of this method, the bentonite is added in milled or granular form after maturation with the acid. For example the acid is mixed with bentonite, extruded or kneaded and heated to a temperature up to 100° C. for sufficient time.

In another variation of this process, the final composite coming out of the final semi-dry/silica gel stage is washed with water to increase the pH above 2.5 and the slurry is optionally left to sediment in a thickening tank. Sediment is filtered to obtain the end product while the acid effluent is enriched with fresh mineral acid and is used to acidify (pre-activate) new batch of Ca-M.

In another variation of the above process, the final composite is dried to about 0% moisture or smoothly calcined.

In another variation of this process, the starting raw material contains not only DE or moler but also an amount of Ca-M.

Figure 3:
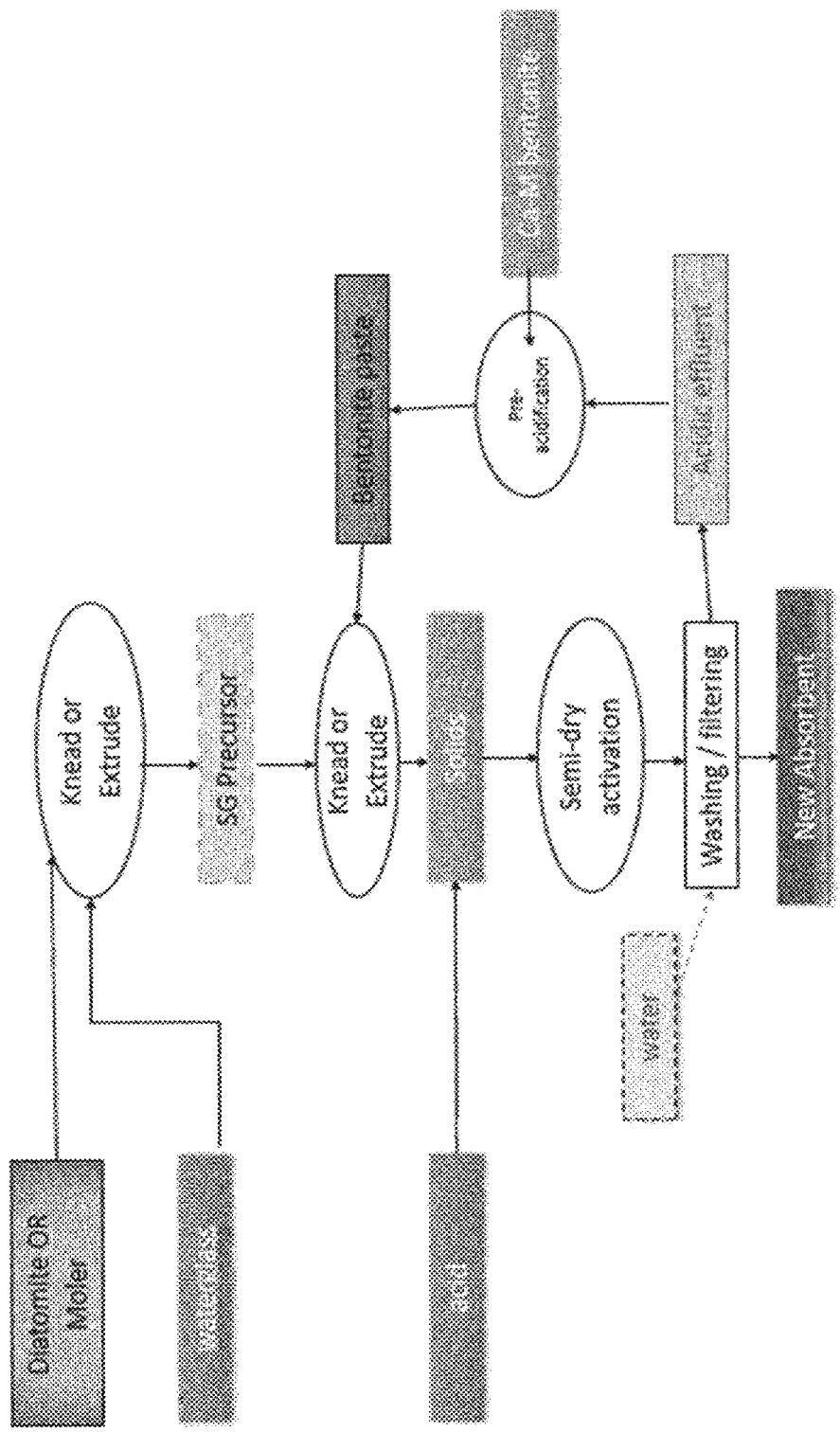
FIG. 3 is a schematic diagram of the method described in Example 3.

A schematic diagram of the methods used in Example 3 is shown in FIG. 3. Products in accordance with the invention may be made by this method.

Examples 4-9

Evaluation Methodology

All resulting materials are evaluated with oil bleaching test in physically refined canola oil by adding 4% of the materials in 100 g of oil and heating at 80° C. for 30 minutes under stirring and then filtering. The oil retained by the adsorbent was evaluated gravimetrically and is presented as oil loss (wt %).

The colour of the oil after bleaching test is evaluated with Tintometer Lovibond Model PFXi 880/F FFA as Red and Yellow values. The materials were also characterized by means of Specific Surface Area (SSA), according to Brunaeur-Emmett-Teller (BET) and pore size distribution using nitrogen porosimetry. In the initial raw materials and resulting adsorbents chemical analysis by X-ray fluorescence (XRF) was performed to determine the ingredients of the adsorbents as well as Scanning Electron Microscopy (SEM) and Energy Dispersive Spectroscopy (EDS) to observe the morphology and analysis of the adsorbent ingredients.

Example 4

100 g of milled calcium bentonite with a moisture content of approximately 10% was sprayed with 84 mL of sulfuric acid of concentration 10 N while mixing. The acid-sprayed bentonite was dried to a moisture level of 0%. 22 g of diatomite having a $d_{90}$ of about 30 μm was sprayed with 28 g liquid sodium waterglass (46% solids, modulus of greater than 3.6) and mixed thoroughly. The acid sprayed bentonite and 200 mL of water were added and mixed all together to create a loose paste.

The paste was washed gradually by adding 3 L of deionized water in doses and centrifuging until the pH was greater than 2.9. The washed solid was dried to a moisture content of 10 to 12% and milled to 170 mesh before evaluation.

The synthesis of the adsorbent was calculated to be 73% acid activated bentonite, 6% silica gel and 21% diatomite. The bleachability of the absorbent as indicated by Red and Yellow values is comparable to that of the commercial one, especially for Red. The oil loss is lower for the adsorbent by 7%, which is explained by the reduced pore volume (0.39 cm$^3$/g) compared to the commercial material. The SSA is about 220 m$^2$/g, which is in the range of commercial products.

Figure 4:
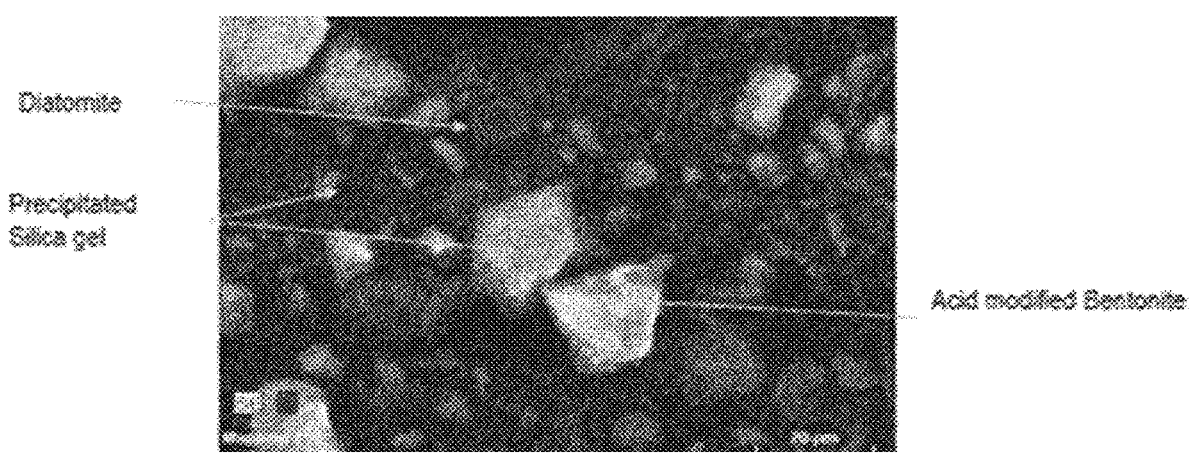
FIG. 4 is a SEM image of the material made in Example 4.

SEM images (FIG. 4) indicate the presence of silica gel, as cloudy particles with size from some nm to 20 microns, diatomite particles with the characteristic shell morphology and acid treated bentonite particles with regular shape.

Example 5

The same procedure and quantities as in Example 4 were used but with a different type of diatomite (calcined, d$_{90}$ of about 100 μm). The SSA is in the acceptable range of 220 m$^2$/g and the bleachability is about the same as the commercial material. The oil loss is reduced by 16%, as expected by the pore volume reduction. The filterability of this sample was determined and found to be 0.05 Darcy, which is equal to commercially available HPBE.

Example 6

The same procedure and quantities as in Example 4 were used but milled calcium bentonite (d$_{90}$ of about 100 μm) was used instead of diatomite. The bleachability is similar to commercial product with a concurrent reduction of oil loss of about 15%.

Example 7

The same procedure as in Example 4 was used but a solution of waterglass with 23% solids, modulus>3.6 was used in a quantity of 56 g.

Example 8

The same procedure as in Example 4 was used but 14 g liquid sodium waterglass was added. In this case the bleachability is comparable to commercial product. The oil loss is not highly reduced, attributed to the different conditions of silica gel precipitation, because of the lower concentration of waterglass solution.

Comparative Example 9

In this example, a commercial type adsorbent was produced using only bentonite and a conventional production method. A quantity of 240 g of milled calcium bentonite was added to an atmospheric reactor with 960 g of sulfuric acid of 4 N concentration. The pulp was stirred (325 rpm) under heating at 90° C. for 4 hours. After the end of the experiment the pulp was filtered and washed gradually by adding 8 L of deionized water in doses and centrifuging until the pH was greater than 2.9. The washed solid was dried at 10-12% moisture content and milled (170 mesh) before evaluation. The resulting product was a product almost identical to the commercial material, with the exception of higher SSA, probably due to the use of a different raw material.

Results

The results concerning the materials produced as described in the Examples 4-8 and Comparative Example 9 are presented in Table 1 below. Example materials were compared with a commercial high performance bleaching earth (Tonsil, Clariant).

TABLE 1

|  | Example 4 | Example 5 | Example 6 | Example 7 | Example 8 | Comparative Example 9 | Commercial HPBE |
|---|---|---|---|---|---|---|---|
| Red | 2.0 | 1.9 | 2.0 | 2.1 | 2.0 | 1.9 | 1.9 |
| Yellow | 26 | 22 | 24 | 26 | 26 | 21 | 22 |
| Oil loss (% w.t.) | 4.31 | 3.88 | 3.90 | 4.53 | 3.5 | 4.7 | 4.64 |
| SSA (m$^2$/g) | 219 | 217 | 225 | 160 | 184 | 276 | 224 |
| Pore volume (cm3/g) | 0.39 | 0.32 | 0.35 | 0.28 | 0.27 | 0.44 | 0.44 |

Pore Size Distribution of Examples 4-6

Figure 5:
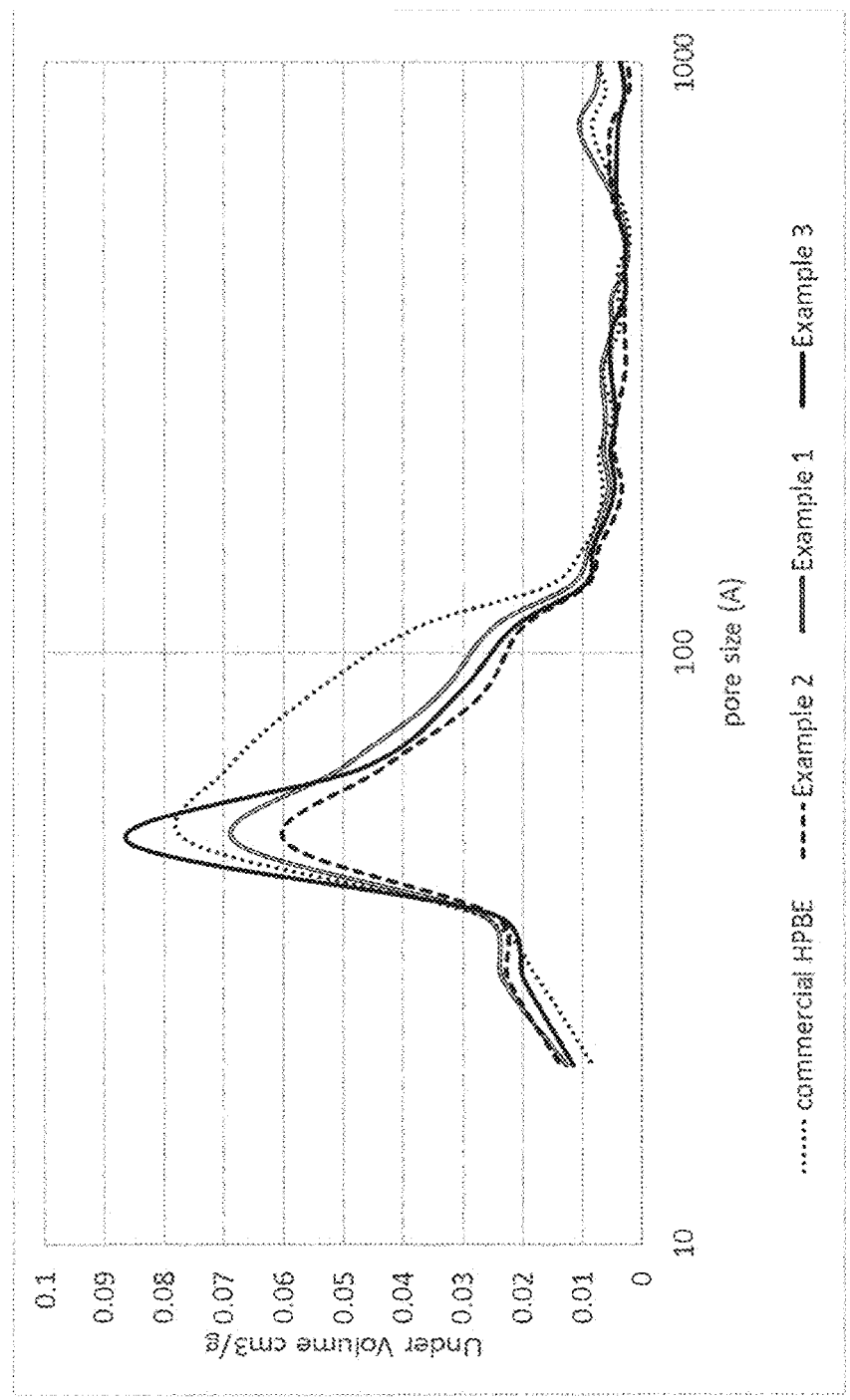
FIG. 5 is a pore size distribution graph for the materials made in Examples 4 to 6 and the commercial material.

The pore size distribution of adsorbents produced in Examples 4 to 6 is presented in FIG. 5, as well as the distribution for a commercial HPBE. The total pore volume, as indicated by the area below the distribution curve, is lower for adsorbents of current application compared to commercial product. This is in accordance to the oil loss values, as lower pore volume of the adsorbents results to lower quantity of oil retained by the adsorbent in its volumes during the bleaching process, consequently lower oil loss %.

Liquid Waste

The amount of liquid waste was calculated for the Example methods and the Comparative Example. While in Examples 4 to 8, approximately 3.2 L of liquid wastes are produced, a quantity of approximately 8.8 L of liquid waste was produced in Comparative Example 9 (i.e. which represents the conventional method). This means a benefit of 47% less liquid acidic wastes in Examples 4 to 8.

The following numbered paragraphs define particular embodiments of the present invention:
1. A composition comprising:
   a smectite, palygorskite, or sepiolite mineral;
   a second mineral; and
   synthetic amorphous silica;
   wherein the synthetic amorphous silica is dispersed on the surface of at least one of the smectite, palygorskite, or sepiolite mineral and the second mineral.

2. The composition of paragraph 1, wherein the synthetic amorphous silica is dispersed on the surface of both the smectite, palygorskite, or sepiolite mineral and the second mineral.
3. The composition of paragraph 1 or 2, wherein the synthetic amorphous silica is silica gel.
4. The composition of any preceding paragraph, wherein the smectite, palygorskite, or sepiolite mineral is a smectite mineral, for example bentonite.
5. The composition of any preceding paragraph, wherein the smectite, palygorskite, or sepiolite mineral is an acid-treated smectite, palygorskite, or sepiolite mineral.
6. The composition of any preceding paragraph, wherein the second mineral is selected from the group consisting of diatomite, perlite, moler, kaolin, talc, or any combination of one or more thereof.
7. The composition of any preceding paragraph, wherein the second mineral is diatomite.
8. The composition of any preceding paragraph, wherein the smectite mineral and the second mineral are moler.
9. The composition of any preceding paragraph, wherein:
   at least about 60 wt % of particles in the composition are equal to or smaller than 75 μm; and/or
   the composition has a $d_{50}$ ranging from about 10 μm to about 60 μm; and/or
   the composition has a $d_{90}$ ranging from about 40 μm to about 150 μm; and/or
   the composition has a $d_{10}$ ranging from about 1 μm to about 10 μm.
10. The composition of any preceding paragraph, wherein the composition has a moisture content ranging from about 0 wt % to about 25 wt %.
11. The composition of any preceding paragraph, wherein the composition comprises:
    from about 60 wt % to about 98 wt % of the smectite, palygorskite, or sepiolite mineral; and/or
    from about 1 wt % to about 35 wt % of the second mineral; and/or
    from about 1 wt % to about 15 wt % of the synthetic amorphous silica.
12. The composition of any preceding paragraph, wherein the ratio of the smectite, palygorskite, or sepiolite mineral to the second mineral in the composition ranges from about 20:1 to about 1:1, for example from about 10:1 to about 2:1.
13. The composition of any preceding paragraph, wherein the composition has a specific surface area (SSA) equal to or greater than about 100 $m^2/g$, for example equal to or greater than about 200 $m^2/g$.
14. The composition of any preceding paragraph, wherein the composition has a specific surface area (SSA) equal to or less than about 400 $m^2/g$, for example equal to or less than about 300 $m^2/g$.
15. The composition of any preceding paragraph, wherein the composition has a pore volume equal to or less than about 0.9 $cm^3/g$, for example equal to or less than about 0.5 $cm^3/g$.
16. The composition of any preceding paragraph, wherein the composition has a pore volume equal to or greater than about 0.05 $cm^3/g$, for example equal to or greater than about 0.1 $cm^3/g$.
17. The composition of any preceding paragraph, wherein the composition has an average pore size ranging from about 30 nm to about 200 nm.
18. The composition of any preceding paragraph, wherein the composition has a filterability equal to or greater than about 0.01 Darcy, for example equal to or greater than about 0.04 Darcy.
19. The composition of any preceding paragraph, wherein the smectite, palygorskite, or sepiolite mineral:
    has a $d_{90}$ ranging from about 30 μm to about 150 μm; and/or
    has a $d_{50}$ ranging from about 5 μm to about 60 μm; and/or
    has a $d_{10}$ ranging from about 0.1 μm to about 10 μm.
20. The composition of any preceding paragraph, wherein the smectite, palygorskite, or sepiolite mineral:
    has a specific surface area (SSA) ranging from about 50 $m^2/g$ to about 300 $m^2/g$; and/or
    has a pore volume ranging from about 0.2 $cm^3/g$ to about 0.9 $cm^3/g$; and/or
    has an average pore size ranging from about 3 nm to about 400 nm.
21. The composition of any preceding paragraph, wherein the second mineral:
    has a $d_{90}$ ranging from about 10 μm to about 150 μm; and/or
    has a $d_{50}$ ranging from about 6 μm to about 100 μm; and/or
    has a $d_{10}$ ranging from about 2 μm to about 35 μm.
22. The composition of any preceding paragraph, wherein the second mineral:
    has a specific surface area (SSA) ranging from about 2 $m^2/g$ to about 300 $m^2/g$; and/or
    has a pore volume ranging from about 0.001 $cm^3/g$ to about 0.9 $cm^3/g$; and/or
    has an average pore size ranging from about 2 nm to about 25 μm.
23. The composition of any preceding paragraph, wherein the composition further comprises free particles of synthetic amorphous silica.
24. The composition of paragraph 23, wherein the free particles of synthetic amorphous silica and aggregates of the free particles of synthetic amorphous silica have a size less than about 50 μm.
25. A method for making a composition, the method comprising forming synthetic amorphous silica on at least one of a smectite, palygorskite, or sepiolite mineral and a second mineral such that the synthetic amorphous silica is dispersed on the surface of the smectite, palygorskite, or sepiolite mineral and/or the second mineral, wherein
    a) the synthetic amorphous silica is dispersed on the surface of both of the smectite, palygorskite, or sepiolite mineral and the second mineral;
    b) the synthetic amorphous silica is dispersed on the surface of the smectite, palygorskite, or sepiolite mineral, and the smectite, palygorskite, or sepiolite mineral having synthetic amorphous silica on its surface is combined with a second mineral; or
    c) the synthetic amorphous silica is dispersed on the surface of the second mineral, and the second mineral having synthetic amorphous silica on its surface is combined with a smectite, palygorskite, or sepiolite mineral.
26. The method of paragraph 25a), wherein the smectite mineral and the second mineral are moler.
27. The method of paragraph 26, wherein the smectite, palygorskite, or sepiolite mineral and second mineral further comprises an additional smectite, palygorskite, or sepiolite mineral.

28. The method of paragraph 25a), 26 or 27, wherein the method further comprises combining the smectite, palygorskite, or sepiolite mineral and second mineral with an additional smectite, palygorskite, or sepiolite mineral and/or an additional diatomite mineral, for example wherein the additional smectite, palygorskite, or sepiolite mineral and/or additional diatomite have synthetic amorphous silica dispersed on its surface.
29. The method of paragraph 25b), wherein the second mineral has synthetic amorphous silica dispersed on its surface.
30. The method of paragraph 25c), wherein the smectite, palygorskite, or sepiolite mineral has synthetic amorphous silica dispersed on its surface.
31. The method of paragraph 25a) or 25b), wherein the smectite, palygorskite, or sepiolite mineral comprises at least about 2 wt % of an amorphous silica phase.
32. The method of paragraph 31, wherein the smectite, palygorskite, or sepiolite mineral is combined with a hydroxide solution before the smectite, palygorskite, or sepiolite mineral is combined with an acid.
33. The method of paragraph 31 or 32, wherein the method does not comprise combining the smectite, palygorskite, or sepiolite mineral with a silicate.
34. The method of any of paragraphs 25 to 31, wherein the synthetic amorphous silica is formed on the smectite, palygorskite, or sepiolite mineral and/or the second mineral by combining the smectite, palygorskite, or sepiolite mineral and/or the second mineral with a silicate and an acid.
35. The method of paragraph 34, wherein the silicate is an alkali metal silicate solution.
36. The method of any one of paragraphs 32 to 35, wherein the acid is a mineral acid such as sulphuric acid or hydrochloric acid.
37. The method of any of paragraphs 32 to 36, wherein the acid has a concentration ranging from about 5 N to about 30 N, for example from about 7 N to about 15 N.
38. The method of any one of paragraphs 34 to 37, wherein the silicate is combined in an amount such that the pH of the resulting composition is equal to or greater than about 2.5.
39. The method of any one of paragraphs 34 to 38, wherein the acid is combined with the smectite, palygorskite, or sepiolite mineral and/or the second mineral before the silicate.
40. The method of any preceding paragraph, wherein the synthetic amorphous silica is silica gel.
41. The method of any preceding paragraph, further comprising drying the composition to a moisture content ranging from about 0 wt % to about 25 wt % or calcining the composition.
42. The method of any preceding paragraph, further comprising milling the composition, for example such that:
    at least about 60 wt % of particles in the composition are equal to or smaller than 75 µm; and/or
    the composition has a $d_{50}$ ranging from about 10 µm to about 60 µm; and/or
    the composition has a $d_{90}$ ranging from about 40 µm to about 150 µm; and/or
    the composition has a $d_{10}$ ranging from about 1 µm to about 10 µm.
43. The method of any preceding paragraph, wherein the smectite, palygorskite, or sepiolite mineral is bentonite.
44. The method of any preceding paragraph, wherein the second mineral is selected from the group consisting of diatomite, perlite, moler, kaolin, talc, or any combination of one or more thereof.
45. The method of any preceding paragraph, wherein the second mineral is diatomite.
46. The method of any preceding paragraph, wherein the composition comprises:
    from about 60 wt % to about 99 wt % smectite, palygorskite, or sepiolite mineral; and/or
    from about 1 wt % to about 35 wt % diatomite; and/or
    from about 1 wt % to about 15 wt % silica gel.
47. The method of any preceding paragraph, wherein the ratio of the smectite, palygorskite, or sepiolite mineral to the second mineral in the composition ranges from about 20:1 to about 1:1, for example from about 10:1 to about 2:1.
48. The method of any preceding paragraph, wherein the composition has a specific surface area (SSA) equal to or greater than about 100 $m^2/g$, for example equal to or greater than about 200 $m^2/g$.
49. The method of any preceding paragraph, wherein the composition has a specific surface area (SSA) equal to or less than about 400 $m^2/g$, for example equal to or less than about 300 $m^2/g$.
50. The method of any preceding paragraph, wherein the composition has a pore volume equal to or less than about 0.9 $cm^3/g$, for example equal to or less than about 0.5 $cm^3/g$.
51. The method of any preceding paragraph, wherein the composition has a pore volume equal to or greater than about 0.05 $cm^3/g$, for example equal to or greater than about 0.1 $cm^3/g$.
52. The method of any preceding paragraph, wherein the composition has an average pore size ranging from about 30 nm to about 200 nm.
53. The method of any preceding paragraph, wherein the composition has a filterability equal to or greater than about 0.01 Darcy, for example equal to or greater than about 0.04 Darcy.
54. The method of any preceding paragraph, wherein the smectite, palygorskite, or sepiolite mineral:
    has a $d_{90}$ ranging from about 30 µm to about 150 µm; and/or
    has a $d_{50}$ ranging from about 5 µm to about 50 µm; and/or
    has a $d_{10}$ ranging from about 0.1 µm to about 10 µm.
55. The method of any preceding paragraph, wherein the smectite, palygorskite, or sepiolite mineral:
    has a specific surface area (SSA) ranging from about 50 $m^2/g$ to about 300 $m^2/g$; and/or
    has a pore volume ranging from about 0.2 $cm^3/g$ to about 0.9 $cm^3/g$; and/or
    has an average pore size ranging from about 3 nm to about 400 nm.
56. The method of any preceding paragraph, wherein the second mineral:
    has a $d_{90}$ ranging from about 10 µm to about 150 µm; and/or
    has a $d_{50}$ ranging from about 6 µm to about 100 µm; and/or
    has a $d_{10}$ ranging from about 2 µm to about 35 µm.
57. The method of any preceding paragraph, wherein the second mineral:
    has a specific surface area (SSA) ranging from about 2 $m^2/g$ to about 300 $m^2/g$; and/or
    has a pore volume ranging from about 0.001 $cm^3/g$ to about 0.9 $cm^3/g$; and/or has an average pore size ranging from about 2 nm to about 25 μm.
58. The method of any preceding paragraph, wherein the method further comprises forming free particles of silica gel.
59. The method of paragraph 58, wherein the free particles of silica gel or aggregates of the free particles of silica gel have a particle size of less than about 50 μm.
60. Use of a composition of any one of paragraphs 1 to 24 for the purification of a liquid, wherein the use comprises combining the composition of any one of paragraphs 1 to 24 with the liquid.
61. A method of bleaching and/or filtering a liquid, the method comprising combining the liquid with a composition of any one of paragraphs 1 to 24.
62. The use of paragraph 59 or method of paragraph 60, wherein the liquid is a non-aqueous liquid.
63. The use or method of paragraph 62, wherein the non-aqueous liquid is an oil, for example an edible oil, an industrial oil, or a biodiesel.
64. The use or method of paragraph 63, wherein the oil is selected from canola oil, soybean oil, sunflower oil, corn oil, olive oil, fish oil or a combination of one or more thereof.
65. A composition obtained by and/or obtainable by the method of any one of paragraphs 25 to 58.

The foregoing broadly describes certain embodiments of the present invention without limitation. Variations and modifications as will be readily apparent to those skilled in the art are intended to be within the scope of the present invention as defined in and by the appended claims.

The invention claimed is:
1. A composition comprising:
    a palygorskite, or sepiolite mineral;
    a second mineral comprising moler, wherein the second mineral is different from the palygorskite, or sepiolite mineral already present in the composition; and
    synthetic amorphous silica;
    wherein the synthetic amorphous silica is dispersed on the surface of at least one of the palygorskite, or sepiolite mineral and the second mineral.
2. The composition of claim 1, wherein the synthetic amorphous silica is dispersed on the surface of both the palygorskite, or sepiolite mineral and the second mineral.
3. The composition of claim 1, wherein the synthetic amorphous silica is silica gel.
4. The composition of claim 1, wherein:
    at least 60 wt % of particles in the composition are equal to or smaller than 75 μm; and/or
    the composition has a d50 ranging from about 10 μm to about 60 μm; and/or
    the composition has a d90 ranging from about 40 μm to about 150 μm; and/or
    the composition has a d10 ranging from about 1 μm to about 10 μm.
5. The composition of claim 1, wherein the composition comprises:
    from about 60 wt % to about 98 wt % of the palygorskite, or sepiolite mineral;
    from about 1 wt % to about 35 wt % of the second mineral; and
    from about 1 wt % to about 15 wt % of the synthetic amorphous silica.
6. The composition of claim 1, wherein the ratio of the palygorskite, or sepiolite mineral to the second mineral in the composition ranges from about 20:1 to about 1:1.
7. The composition of claim 1, wherein the composition has a specific surface area (SSA) equal to or greater than about 100 m$^2$/g.
8. The composition of claim 1, wherein the composition has a pore volume equal to or less than 0.9 cm3/g.
9. The composition of claim 1, wherein the composition has a filterability equal to or greater than 0.01 Darcy.
10. The composition of claim 2, wherein:
    at least 60 wt % of particles in the composition are equal to or smaller than 75 μm;
    the composition has a d10 ranging from about 1 μm to about 10 μm;
    the composition has a d50 ranging from about 10 μm to about 60 μm; and
    the composition has a d90 ranging from about 40 μm to about 150 μm.
11. The composition of claim 10, wherein the composition comprises:
    from about 60 wt % to about 98 wt % of the palygorskite, or sepiolite mineral;
    from about 1 wt % to about 35 wt % of the second mineral; and
    from about 1 wt % to about 15 wt % of the synthetic amorphous silica.
12. The composition of claim 11, wherein:
    the composition has a specific surface area (SSA) equal to or greater than 200 m$^2$/g;
    the composition has a pore volume equal to or less than 0.5 cm$^3$/g; and
    the composition has a filterability equal to or greater than 0.04 Darcy.
13. A method for making the composition of claim 1, the method comprising forming synthetic amorphous silica on at least one of a palygorskite, or sepiolite mineral and a second mineral comprising Moler such that the synthetic amorphous silica is dispersed on the surface of the palygorskite, or sepiolite mineral and/or the second mineral, wherein
    a) the synthetic amorphous silica is dispersed on the surface of both of the palygorskite, or sepiolite mineral and the second mineral;
    b) the synthetic amorphous silica is dispersed on the surface of the palygorskite, or sepiolite mineral, and the palygorskite, or sepiolite mineral having synthetic amorphous silica on its surface is combined with the second mineral; or
    c) the synthetic amorphous silica is dispersed on the surface of the second mineral, and the second mineral having synthetic amorphous silica on its surface is combined with the palygorskite, or sepiolite mineral.
14. The method of claim 13, wherein the synthetic amorphous silica is formed on the palygorskite, or sepiolite mineral and/or the second mineral by combining the palygorskite, or sepiolite mineral and/or the second mineral with a silicate and an acid.
15. A method of filtering a liquid, the method comprising combining the liquid with the composition of claim 1.

* * * * *